(12) United States Patent
Heilskov et al.

(10) Patent No.: US 11,067,337 B2
(45) Date of Patent: Jul. 20, 2021

(54) GRAIN DRYER UNLOAD SYSTEM

(71) Applicant: Sukup Manufacturing Co., Sheffield, IA (US)

(72) Inventors: Casey Scott Heilskov, Hampton, IA (US); Kerry Hartwig, Iowa Falls, IA (US)

(73) Assignee: SUKUP MANUFACTURING CO., Sheffield, IA (US)

( * ) Notice: Subject to any disclaimer, the term of this patent is extended or adjusted under 35 U.S.C. 154(b) by 248 days.

(21) Appl. No.: 16/186,643

(22) Filed: Nov. 12, 2018

(65) Prior Publication Data

US 2019/0145706 A1 May 16, 2019

Related U.S. Application Data

(60) Provisional application No. 62/584,452, filed on Nov. 10, 2017.

(51) Int. Cl.
| | |
|---|---|
| *F26B 17/02* | (2006.01) |
| *F26B 25/00* | (2006.01) |
| *B65G 65/46* | (2006.01) |
| *B65G 47/19* | (2006.01) |
| *F26B 23/00* | (2006.01) |

(Continued)

(52) U.S. Cl.
CPC .............. *F26B 17/02* (2013.01); *B65G 47/19* (2013.01); *B65G 65/466* (2013.01); *F26B 17/122* (2013.01); *F26B 23/007* (2013.01); *F26B 25/002* (2013.01); *F26B 25/02* (2013.01); *B65G 19/08* (2013.01); *F26B 2200/06* (2013.01)

(58) Field of Classification Search
CPC ...... F26B 23/007; F26B 25/02; F26B 25/002; F26B 17/02; F26B 17/122; F26B 25/001; F26B 25/003; F26B 2200/06; F26B 9/087; B65G 47/19; B65G 65/466; B65G 19/08
USPC ............................................ 34/166; 222/333
See application file for complete search history.

(56) References Cited

U.S. PATENT DOCUMENTS 2,962,818 A * 12/1960 Forth .................... F26B 17/122
                                                34/167
3,129,073 A *  4/1964 Mathews ............... F26B 17/122
                                                34/575

(Continued)

OTHER PUBLICATIONS

Brock Grain Systems—Superb Energy Miser Jan. 1, 2015.

*Primary Examiner* — Edelmira Bosques
*Assistant Examiner* — Bao D Nguyen
(74) *Attorney, Agent, or Firm* — Christopher A. Proskey; BrownWinick Law Firm

(57) ABSTRACT

A grain dryer unload system is presented that facilitates operation of a discharge system independent of a metering system. A motor connects to an axle that connects to the discharge system, which may be a drag chain, a belt or an auger. The axle also connects to a metering system. A clutch mechanism is connected to an end of the axle and is positioned between the discharge system and the metering system. When the clutch mechanism is in an engaged position, the motor simultaneously operates the metering system and the discharge system. However, when the clutch mechanism is in a disengaged position, the motor operates the discharge system while the metering system does not operate. This arrangement facilitates easier cleaning of the grain dryer without introducing the fines into the grain or a connected grain storage device.

25 Claims, 18 Drawing Sheets

(51) Int. Cl.
*F26B 17/12* (2006.01)
*F26B 25/02* (2006.01)
 B65G 19/08  (2006.01)

(56) References Cited

U.S. PATENT DOCUMENTS

| | | | |
|---|---|---|---|
| 6,457,256 | B1 | 10/2002 | Middaugh et al. |
| 6,834,442 | B1 | 12/2004 | Bloemendaal |
| 7,544,031 | B2 | 6/2009 | Kaeb et al. |
| 2017/0152110 | A1* | 6/2017 | Rauser .................. B65G 33/34 |

* cited by examiner

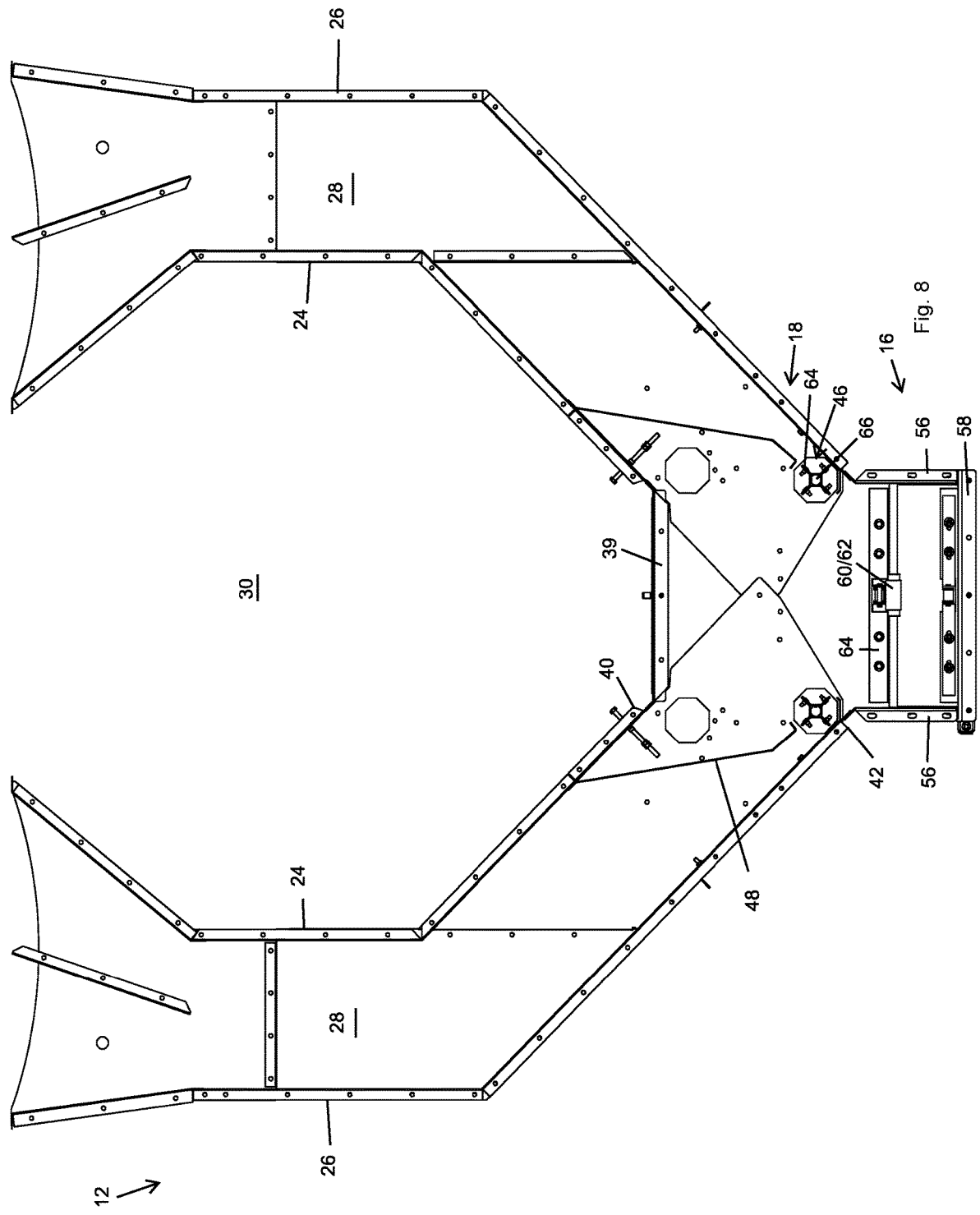

GRAIN DRYER UNLOAD SYSTEM

CROSS REFERENCE TO RELATED APPLICATIONS

This patent application claims priority to provisional patent application Ser. No. 62/584,452 filed on Nov. 10, 2017 entitled "Grain Dryer Unload System, which is fully incorporated by reference herein.

FIELD OF THE ART

This disclosure relates to the material handling arts and grain handling arts. More specifically, and without limitation, this disclosure relates to grain handling in association with grain dryers.

BACKGROUND

Grain dryers are old and well known in the art. Grain dryers are used to reduce the moisture content of grain, such as corn, soybeans, wheat, rice, sorghum, sunflower seeds, canola, barley, oats, and the like. Drying grain allows the grain to be stored for long periods of time without spoilage. In contrast, grain stored with elevated moisture content is likely to spoil. As such, controlling the moisture content of grain is key to being able to store grain for extended periods of time. Various forms of grain dryers have been developed to facilitate the drying of grain.

One common form of a grain dryer is what is known as a continuous flow grain dryer. Continuous flow grain dryers themselves come in countless configurations and variations. However, common among continuous flow grain dryers is that they operate under similar principles in that wet grain is loaded into the top of the grain dryer which travels downward by the force of gravity in a space, also known as a grain column, between a perforated inward wall and a perforated outward wall. As the grain travels down the grain column the grain is exposed to heated air which dries the grain. This heated air flows cross-ways through the grain column as the grain in the grain column travels downward through the grain dryer. When the grain reaches the bottom of the grain dryer it is metered out of the grain dryer by a metering system. The metered grain enters a discharge system which discharges the dried grain out of the grain dryer.

Continuous flow grain dryers provide many benefits. One benefit of continuous flow grain dryers is that they provide high flow rates and are capable of drying great amounts of grain. Another benefit of continuous flow grain dryers is that they can be precisely tuned and can provide highly accurate drying. Yet another advantage of continuous flow grain dryers is that they are energy efficient and can utilize the principles of heat conservation. Yet another advantage of continuous flow grain dryers is that they are easy to use and are robust, among many other advantages.

While continuous flow grain dryers provide a number of benefits, continuous flow grain dryers suffer from many disadvantages. One disadvantage of continuous flow grain dryers is that they require periodic cleaning due to air being sucked through or blown out of the column of grain. This air movement tends to collect particles or "fines" in and/or outside of the continuous flow grain dryer which can cause problems, including being a fire hazard, if periodic cleaning maintenance is not performed.

Another disadvantage for some continuous flow grain dryers is that the metering system and the discharge system are operated by a single motor. This design provides the benefit of utilizing only a single motor to perform two operations (metering of the grain, and discharge of the grain) and therefor provides a cost savings and simplifies the design of the dryer. However, this design makes it impossible to independently operate the metering system and the discharge system.

The direct connection and simultaneous operation of the metering system and the discharge system of continuous flow grain dryers makes it impossible to empty grain held within the area of the discharge system while grain is held in the grain column of a continuous flow grain dryer. This is because, when the discharge system operates to discharge grain from the grain dryer the metering system simultaneously dumps more grain into the discharge system. As such, to empty the discharge area of the discharge system, all of the grain within the grain dryer must be emptied.

Emptying all of the grain out of the grain dryer is undesirable for many reasons. Emptying all of the grain out of the grain dryer is time consuming. In addition, emptying all of the grain out of the grain dryer causes the grain dryer to go out of equilibrium. This means that the user must go through the time consuming, and energy intensive, start-up process when the grain dryer is again filled. In addition, grain that is prematurely emptied out of the grain dryer is often insufficiently dried or overly dried. In addition, grain that is subject to the start-up process when the grain dryer is refilled is also often insufficiently dried or overly dried due to imperfections in the start-up process of the grain dryer.

Due to the amount of time and complexity required to empty the discharge area of the discharge system, this often means that many users do not clean their dryers as often as they should which can lead to an increased risk of fire if excessive fines or other debris build up within the dryer. This can also cause unnecessary delays and increase the complexity of repairs and maintenance to the grain dryer because the discharge area of the discharge system cannot be readily emptied without emptying the entire grain dryer.

While various attempts have been made in the prior art to improve continuous flow grain dryers, the present state of the art suffers from disadvantages and fails to provide an adequate solution.

Therefore, for all the reasons stated above, and the reasons stated below, there is a need in the art for an improved grain dryer unload system.

Thus, it is an object of at least one embodiment to provide a grain dryer unload system that improves upon the state of the art.

Another object of at least one embodiment is to provide a grain dryer unload system that facilitates easier clean out of the grain dryer.

Yet another object of at least one embodiment is to provide a grain dryer unload system that facilitates independent operation of a discharge system from the metering system.

Another object of at least one embodiment is to provide a grain dryer unload system that allows fines cleaned out of the grain dyer to be dumped out of the grain dryer and not into the connected grain storage components.

Yet another object of at least one embodiment is to provide a grain dryer unload system that reduces fire hazards by facilitating easier cleaning of the grain dryer.

Another object of at least one embodiment is to provide a grain dryer unload system that provides new functionality for grain dryers.

Yet another object of at least one embodiment is to provide a grain dryer unload system that improves the safety of using grain dryers.

Another object of at least one embodiment is to provide a grain dryer unload system that is easy to use.

Yet another object of at least one embodiment is to provide a grain dryer unload system that has a robust design.

Another object of at least one embodiment is to provide a grain dryer unload system that works effectively.

Yet another object of at least one embodiment is to provide a grain dryer unload system that saves time.

Another object of at least one embodiment is to provide a grain dryer unload system that is efficient to use.

Yet another object of at least one embodiment is to provide a grain dryer unload system that has a long useful life.

Another object of at least one embodiment is to provide a grain dryer unload system that does not negatively affect the grain dryer's ability dry grain.

Yet another object of at least one embodiment is to provide a grain dryer unload system that allows a single motor to be used to operate the discharge system and the metering system while also allowing for effective cleaning of the grain dryer.

Another object of at least one embodiment is to provide a grain dryer unload system that is durable.

Yet another object of at least one embodiment is to provide a grain dryer unload system that is relatively inexpensive.

Another object of at least one embodiment is to provide a grain dryer unload system that is high quality.

Yet another object of at least one embodiment is to provide a grain dryer unload system that can be used with practically any grain dryer.

Another object of at least one embodiment is to provide a grain dryer unload system that makes it easier to handle and dry large amounts of grain.

Yet another object of at least one embodiment is to provide a grain dryer unload system that reduces the cost of operation of a grain dryer.

Another object of at least one embodiment is to provide a grain dryer unload system that reduces the cost of repairs and maintenance to grain dryer.

Yet another object of at least one embodiment is to provide a grain dryer unload system that reduces the amount of time it takes to perform maintenance and repairs to a grain dryer.

These and other objects, features, or advantages of at least one embodiment will become apparent from the specification, figures and claims.

SUMMARY

A grain dryer unload system is presented that facilitates operation of a discharge system independent of a metering system. A motor connects to an axle that connects to the discharge system, which may be a drag chain, a belt or an auger. The axle also connects to a metering system. A clutch mechanism is connected to an end of the axle and is positioned between the discharge system and the metering system. When the clutch mechanism is in an engaged position, the motor simultaneously operates the metering system and the discharge system. However, when the clutch mechanism is in a disengaged position, the motor operates the discharge system while the metering system does not operate. This arrangement facilitates easier cleaning of the grain dryer without introducing the fines into the grain or a connected grain storage device.

BRIEF DESCRIPTION OF THE DRAWINGS

FIG. 8 is an elevation cut-away view of an end of a grain dryer, the view showing the grain dryer having an interior wall and an exterior wall and a grain column between the interior wall and the exterior wall; the view showing the grain dryer having plenum at its middle that receives heated air from a fan system; the view showing lower metering rolls positioned at the lower end of the grain column; the view showing a discharge system at the bottom of the grain dryer that unloads dry grain from the grain dryer

DETAILED DESCRIPTION

Figure 1:
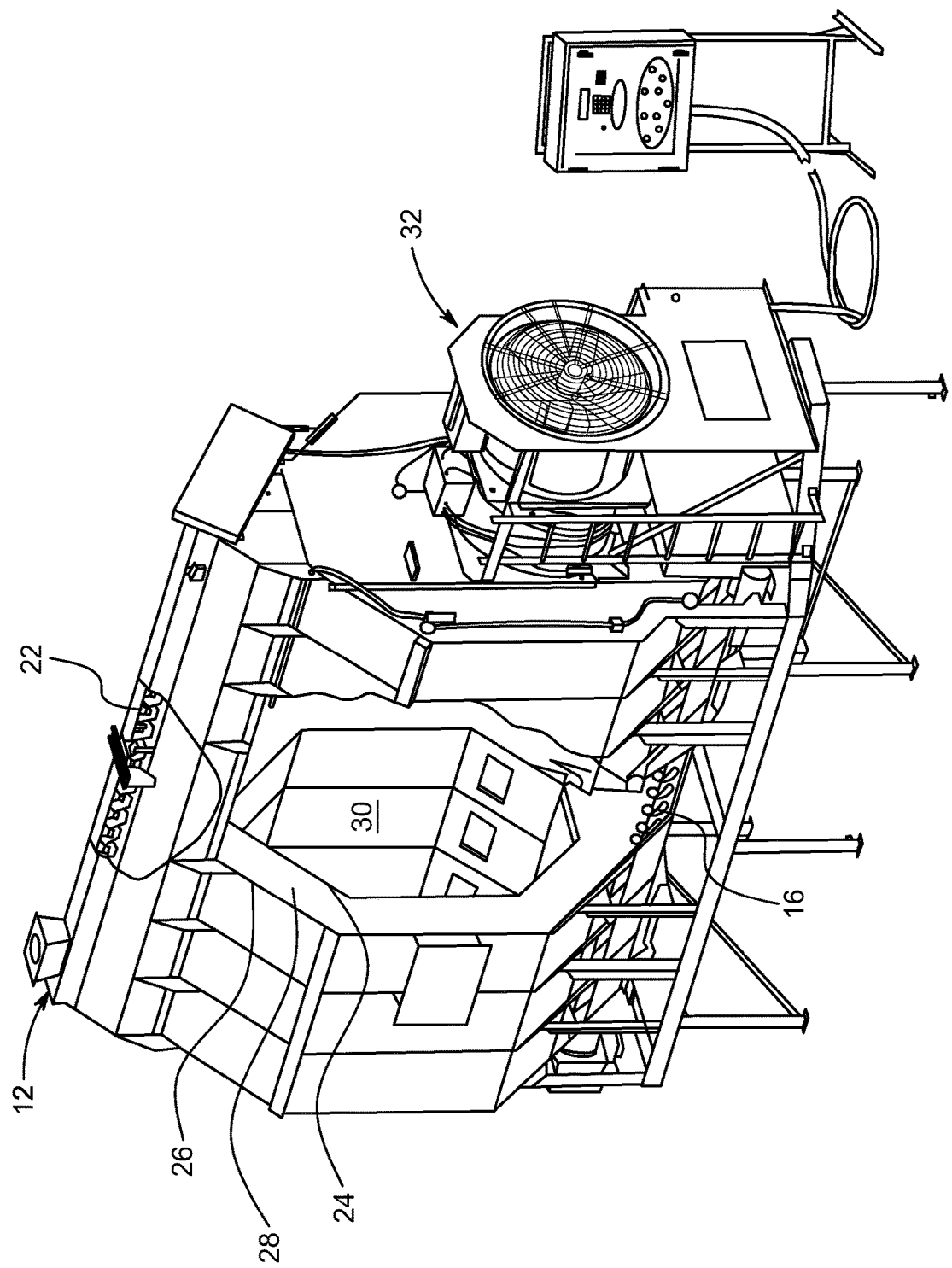
FIG. 1 is a perspective cut-away view of an exemplary grain dryer; the view showing the grain dryer having an interior wall and an exterior wall and a grain column between the interior wall and the exterior wall; the view showing the grain dryer having a plenum at its middle that receives heated air from a fan system; the view showing a loading system at the top of the grain dryer that loads wet grain into the grain dryer and a discharge system at the bottom of the grain dryer that unloads dry grain from the grain dryer.
Figure 2:
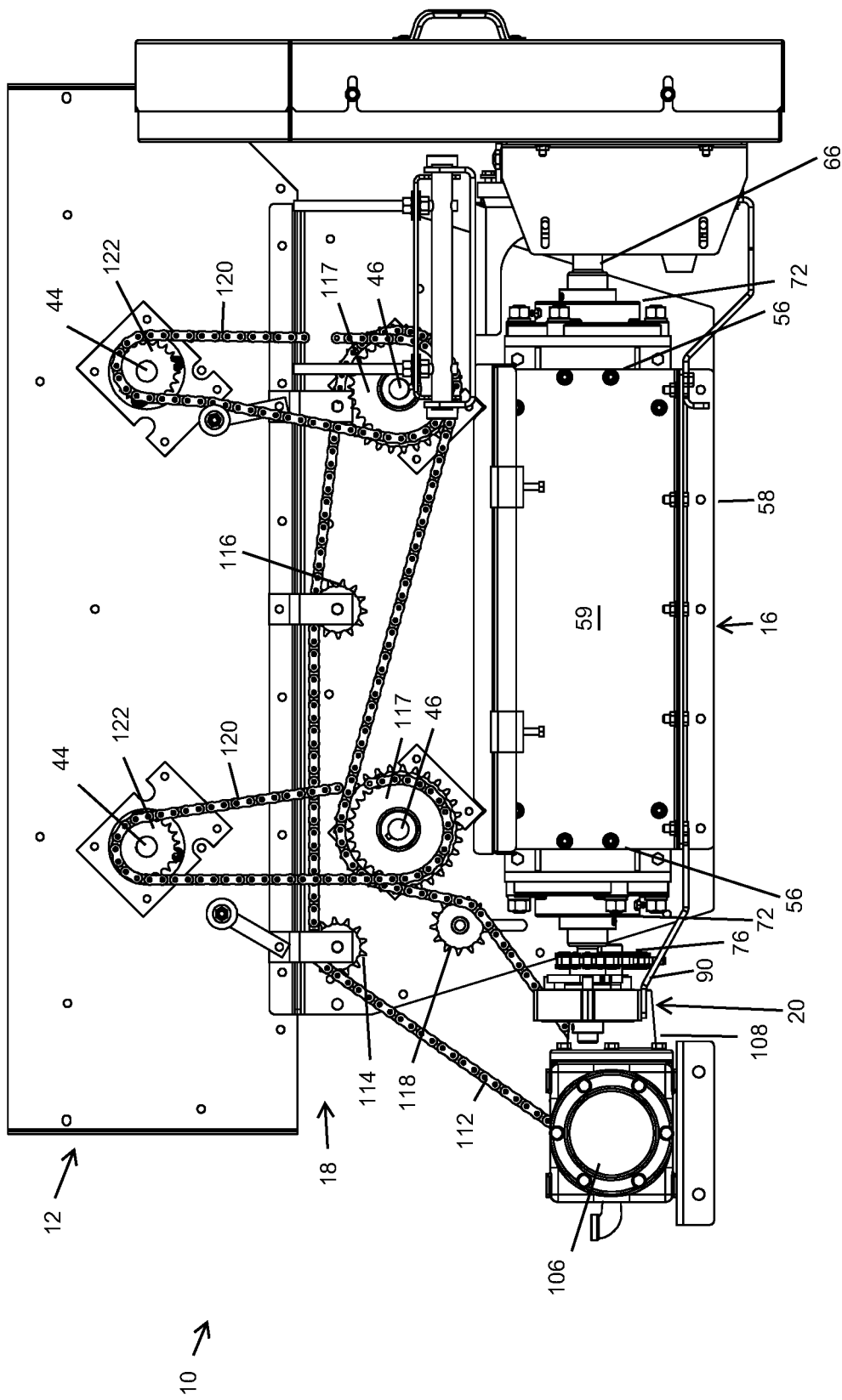
FIG. 2 is an elevation view of an end of a grain dryer; the view showing a discharge system connected to the bottom end of the grain dryer; the view showing an axle extending through the discharge system and a clutch mechanism connected to an end of the axle; the view showing a gearbox connected to the clutch mechanism and a plurality of metering rolls connected to the gearbox by a series of chains and sprockets.
Figure 3:
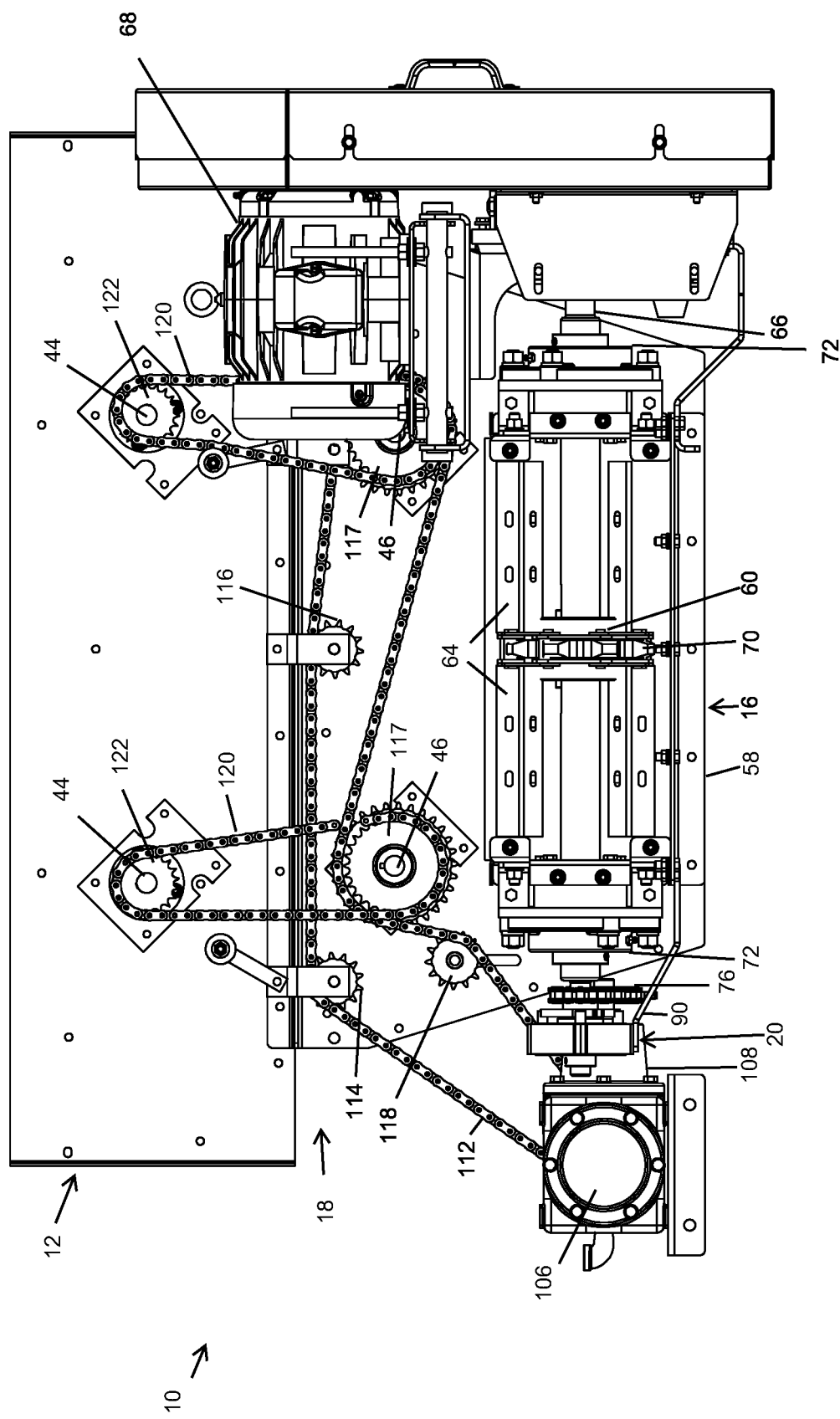
FIG. 3 is an elevation view similar to FIG. 2, with the addition of a motor that is connected to one end of the axle opposite the clutch mechanism and with the removal of the end wall of the discharge system; the view showing the drag chain positioned within the discharge system with flights connected to the drag chain that are configured to move the grain.

In the following detailed description, reference is made to the accompanying drawings which form a part hereof, and in which is shown by way of illustration specific embodiments in which various embodiments of the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure. The following detailed description is, therefore, not to be taken in a limiting sense, and the scope is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

With reference to the figures, a grain dryer unload system 10 (or system 10) is presented. The grain dryer unload system 10 is shown in use with an exemplary grain dryer 12 and includes a discharge system 16, a metering system 18 and a clutch mechanism 20, among other components as is described further herein.

Grain Dryer:

In the arrangement shown, as one example, system 10 is used in association with a grain dryer 12. Grain dryer 12 is formed of any suitable size, shape and design and is configured to reduce the moisture content of grain. In the arrangement shown, as one example, grain dryer 12 is what is known as a continuous flow grain dryer 12 or a cross-flow grain dryer. However any other form of a grain dryer is hereby contemplated for use.

Continuous flow grain dryer 12 operates by receiving wet grain at a top side. This wet grain travels by the force of gravity downward through the grain dryer 12 as it is conditioned by air blowing through the grain. By the time the grain reaches the bottom side of the grain dryer 12 the grain has been dried. This dried grain is discharged at a bottom side of the grain dryer 12.

In the arrangement shown, as one example, grain dryer 12 includes a loading system 22 at its top side that is configured to load wet grain into grain dryer 12. In the arrangement shown, as one example, loading system 22 is formed of an auger system that dispenses grain across the top side of the grain dryer. However any other grain moving device of system is hereby contemplated for use.

In the arrangement shown, as one example, wet grain loaded into grain dryer 12 travels downward on either side of the loading system 22 under the force of gravity between an interior wall 24 and an exterior wall 26. The space between the interior wall 24 and the exterior wall 26 is known as the grain column 28. Interior wall 24 and exterior wall 26 are perforated so as to allow air to flow through the interior wall 24 and the exterior wall 26 while retaining the grain within the grain column 28. These perforations in interior wall 24 and exterior wall 26 allow air to pass through the grain. These perforations in interior wall 24 and exterior wall 26 also allow fines to pass through the interior wall 24 and exterior wall 26 which can accumulate on the exterior surface of the exterior wall 26 when air is being blown outward through the grain column 28 and which can accumulate on the interior surface 24 and/or within the plenum 30 when air is being sucked through the grain column 28.

In the arrangement shown, as one example, a plenum 30 is formed between the interior surfaces of opposing interior walls 24. In the arrangement shown, as one example, plenum 30 is the hollow interior within grain dryer 12. Plenum 30 facilitates air movement through the grain columns 28.

In the arrangement shown as one example in FIG. 1 and FIG. 8, grain dryer 12 is a heat only grain dryer. That is, the plenum 30 is a single, continuous and undivided space within grain dryer 12 that receives heated air blown into plenum 30 from the fan system 32. This heated air then passes outward through the perforated interior wall 24, through the grain within grain column 28, and out the perforated exterior wall 26. In this way, grain within grain column 28 is heated and moisture is expelled from the grain thereby drying the grain.

Figure 8A:
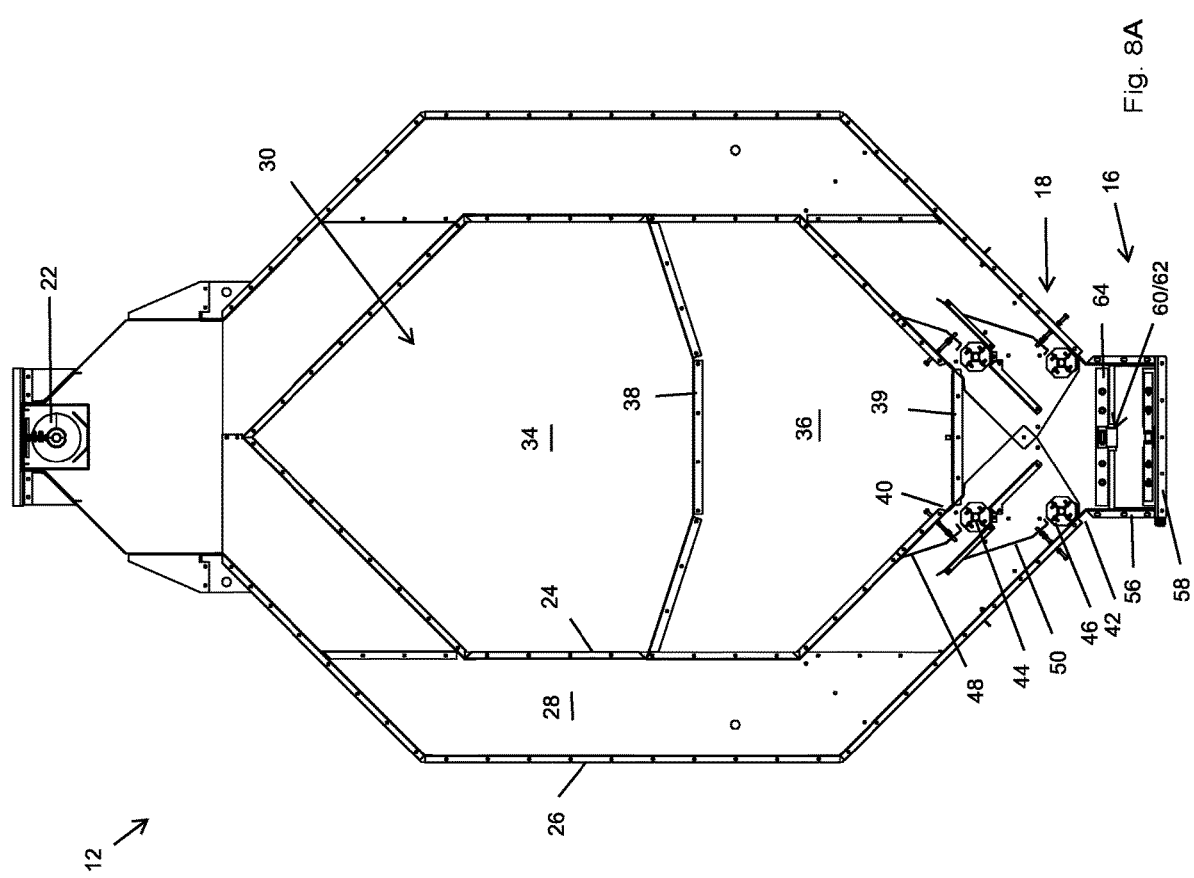
FIG. 8A is an elevation cut-away view of an end of a grain dryer, the view showing the grain dryer having an interior wall and an exterior wall and a grain column between the interior wall and the exterior wall; the view showing the grain dryer having plenum at its middle that receives heated air from a fan system; the view showing the plenum divided by a divider between a heat section and a cool section; the view showing a pair of upper metering rolls and lower metering rolls positioned at the lower end of the grain column; the view showing a discharge system at the bottom of the grain dryer that unloads dry grain from the grain dryer.
Figure 9:
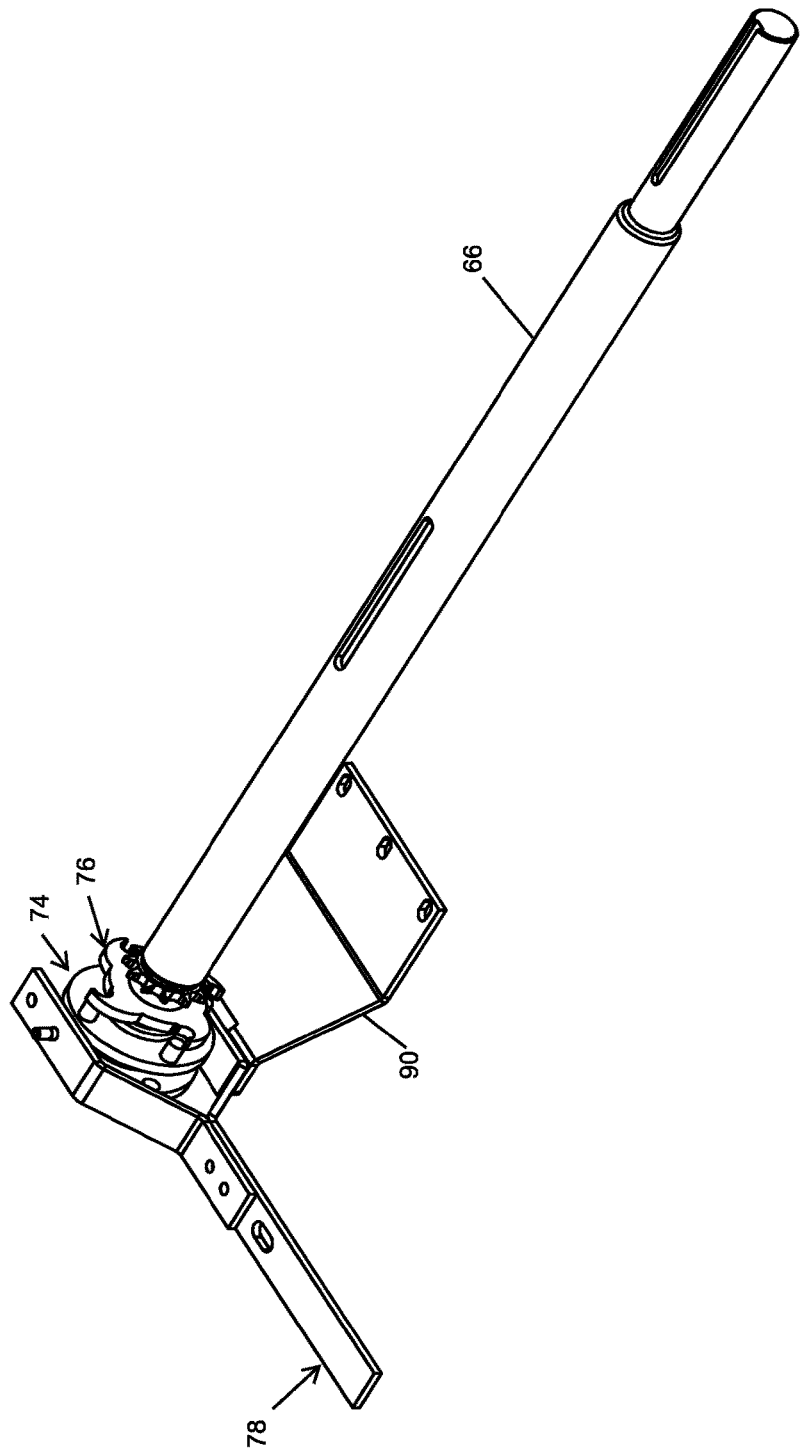
FIG. 9 is a perspective view of an axle connected to a clutch mechanism; the view showing a bracket connected to the lower end of a control arm; the view showing the control arm having a lower arm and an upper arm that reach around a drive member; the view showing an interior side of the drive member having a plurality of drive pins that engage recesses in a driven member; the view showing the driven member having an outward section that has recesses that receive the drive pins of the drive member and an inward section that includes gear teeth that engage a first chain; the view showing the clutch mechanism in a disengaged position.
Figure 10:
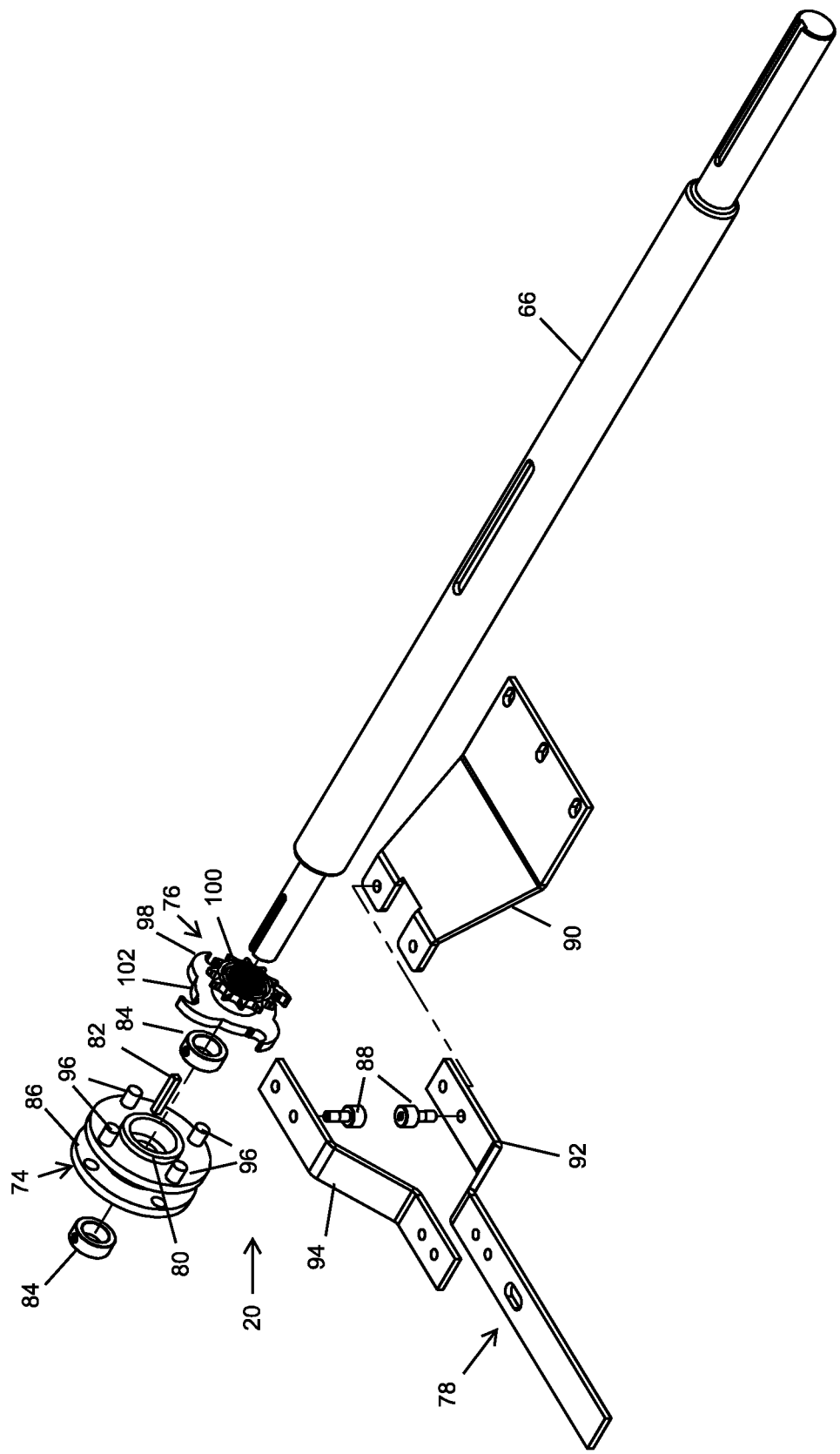
FIG. 10 is an exploded perspective view of FIG. 9; the view showing individual components of the clutch mechanism.
Figure 11:
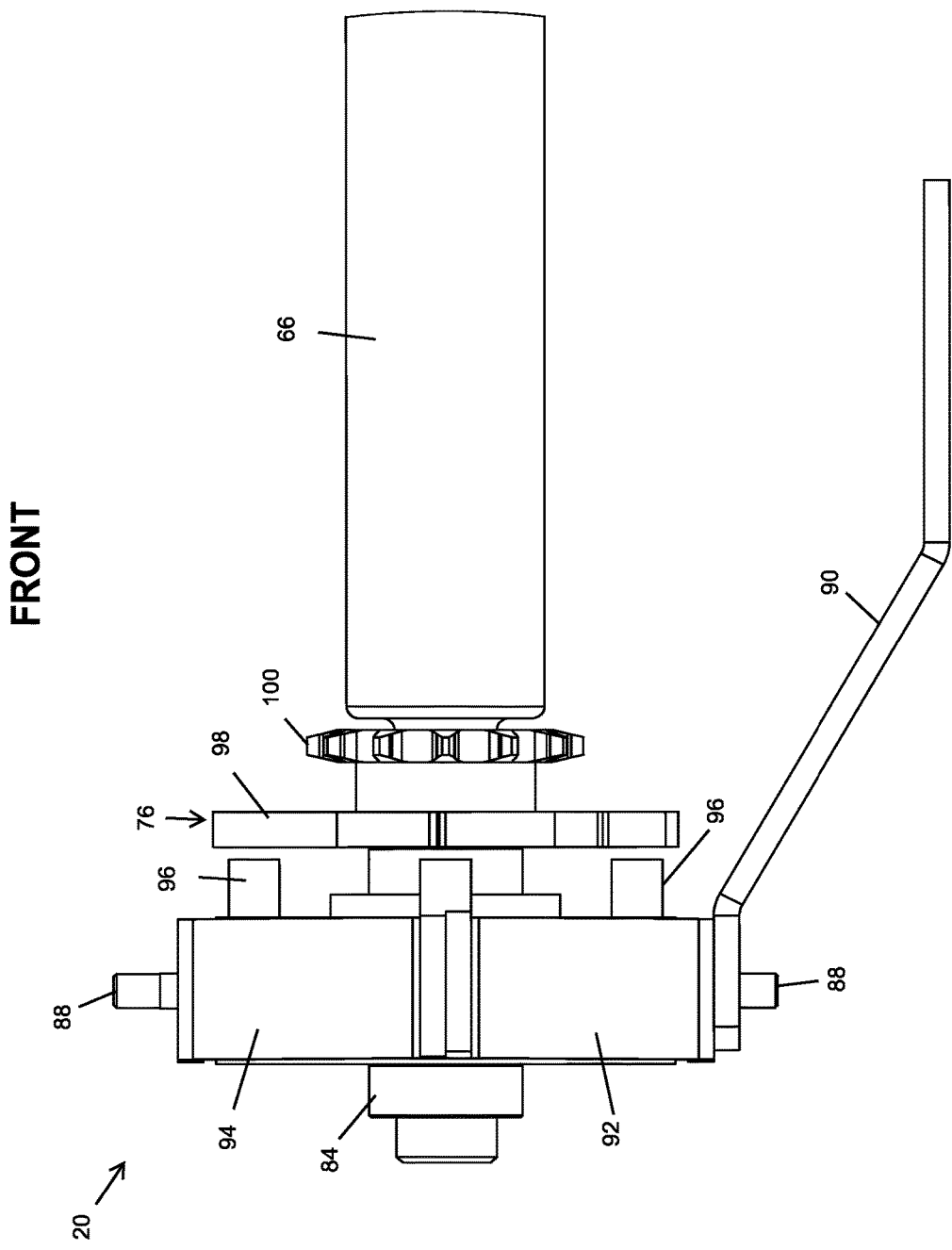
FIG. 11 is a close up elevation view of a front side of the clutch mechanism shown in FIG. 9 and FIG. 10; the view showing the clutch mechanism in a disengaged position.
Figure 12:
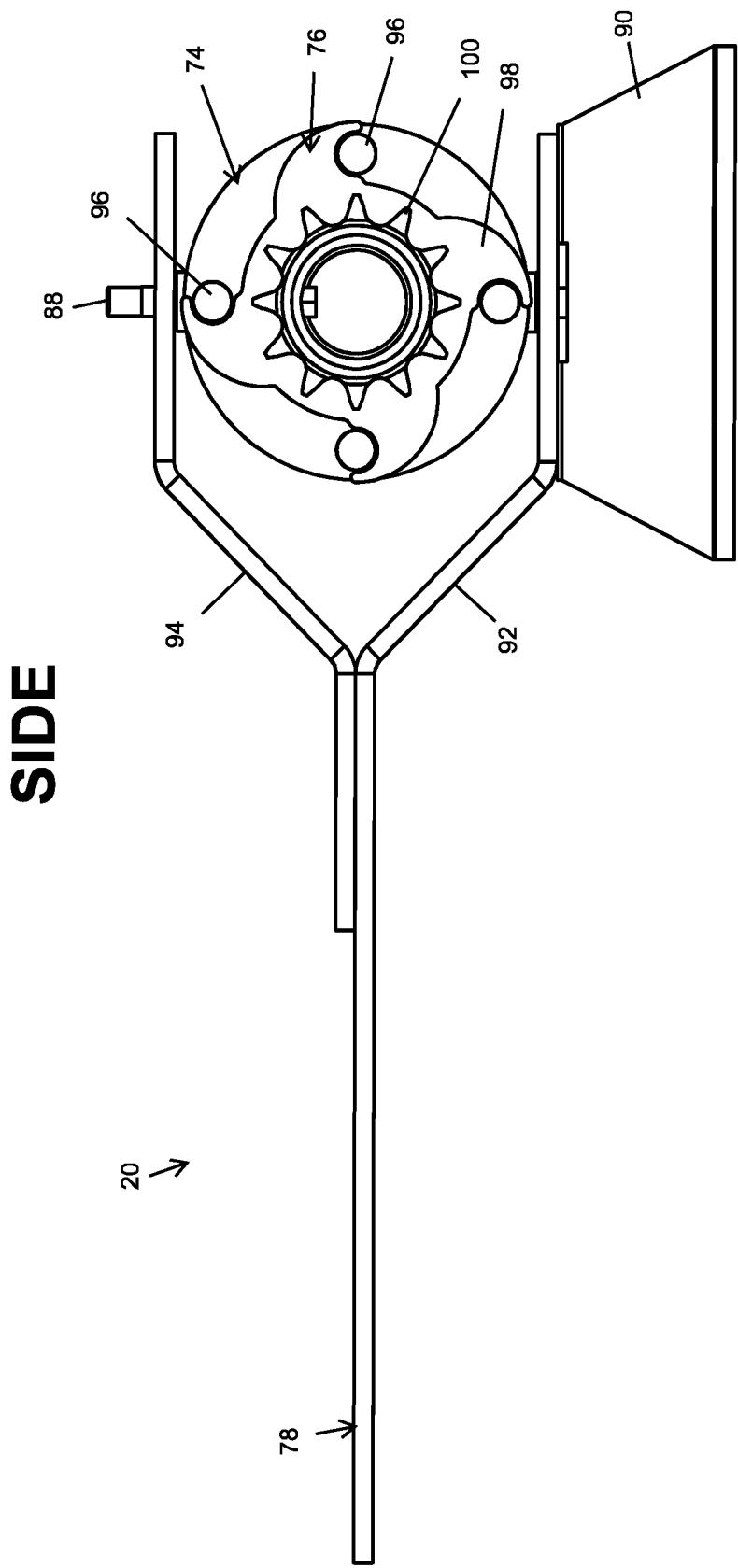
FIG. 12 is a close up elevation view of a side of the clutch mechanism shown in FIG. 9, FIG. 10 and FIG. 11.
Figure 13:
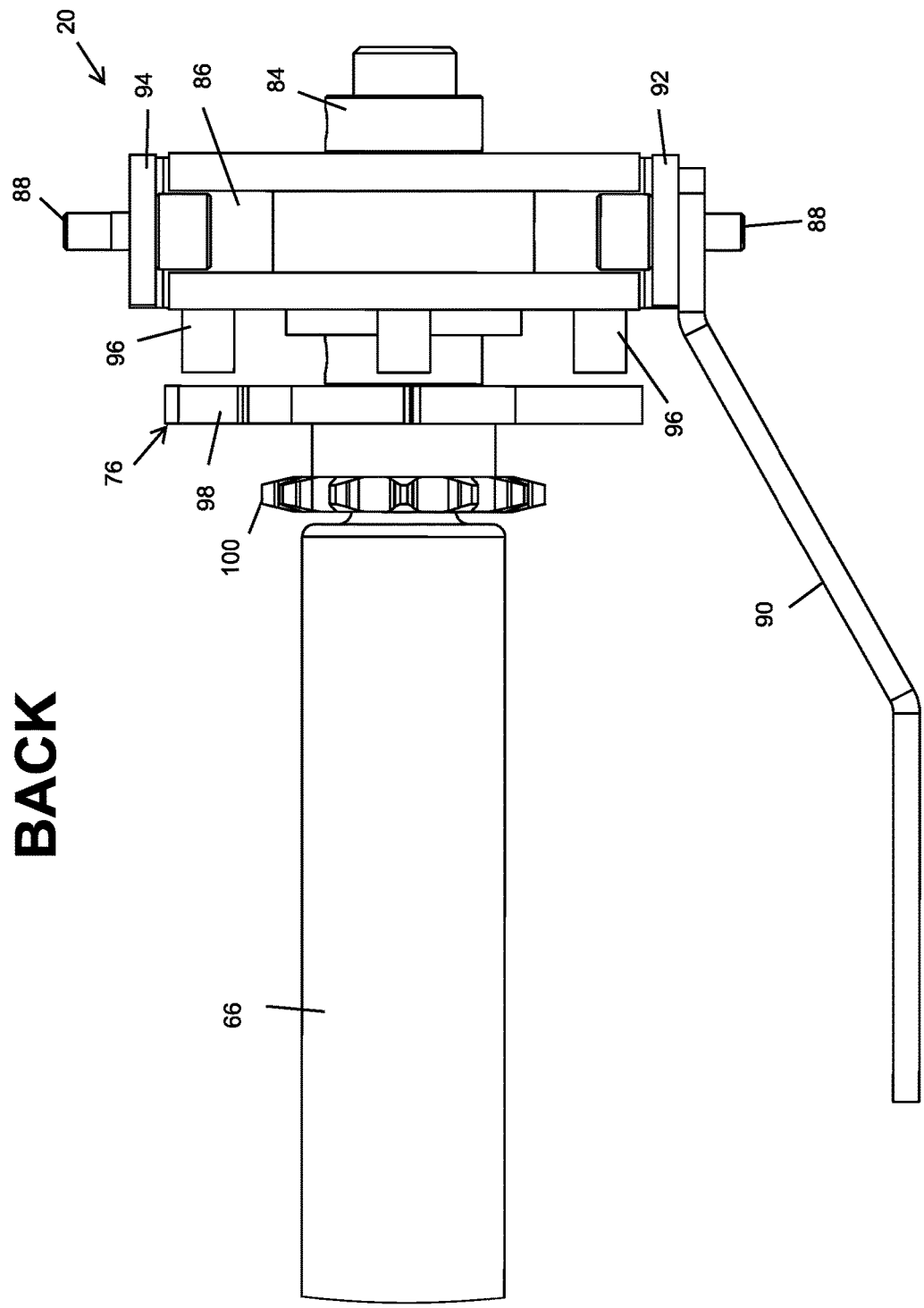
FIG. 13 is a close up elevation view of a back side of the clutch mechanism shown in FIG. 9, FIG. 10, FIG. 11 and FIG. 12; the view showing the clutch mechanism in a disengaged position.
Figure 14:
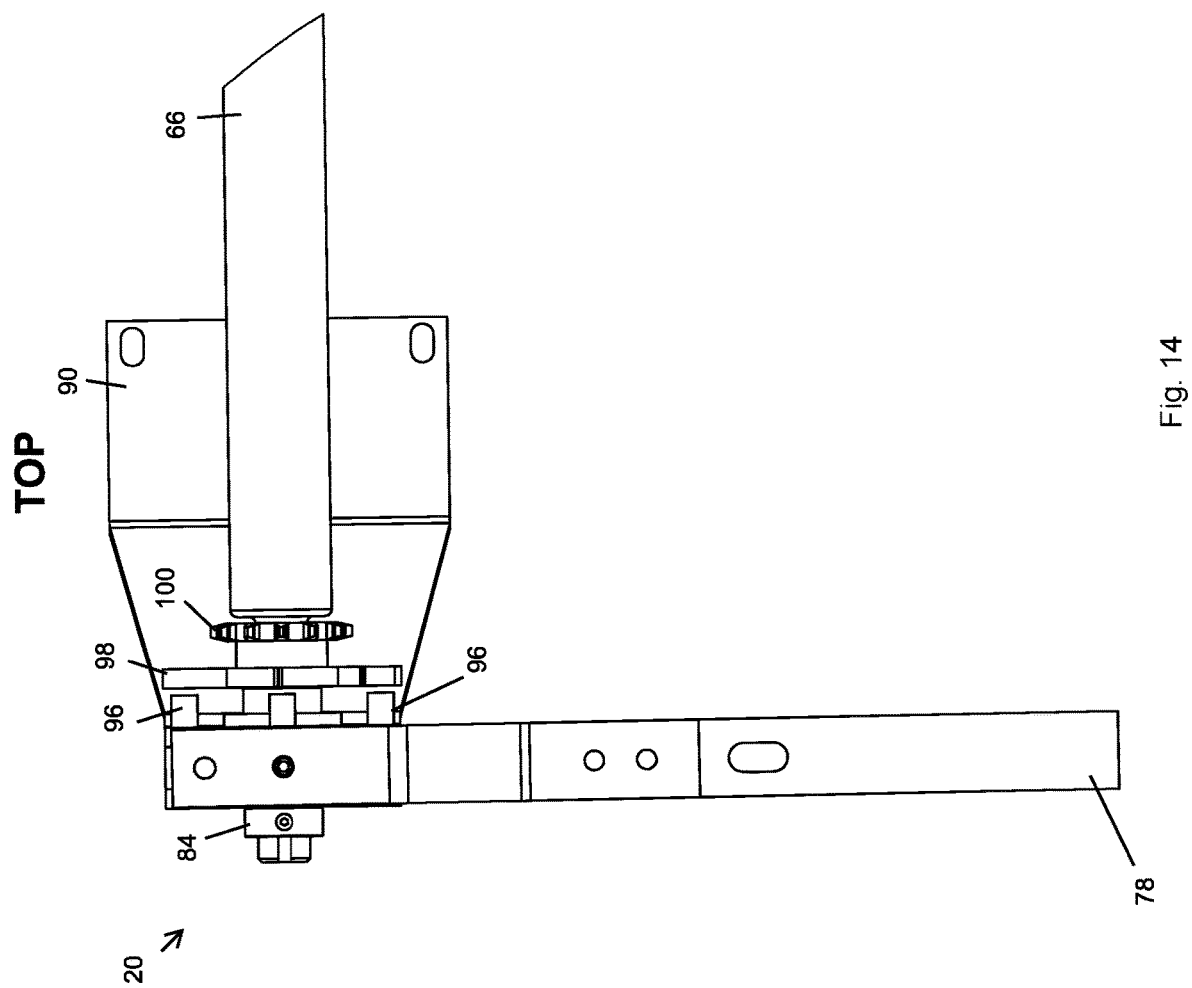
FIG. 14 is a close up elevation view of a top side of the clutch mechanism shown in FIG. 9, FIG. 10, FIG. 11, FIG. 12 and FIG. 13; the view showing the clutch mechanism in a disengaged position.
Figure 15:
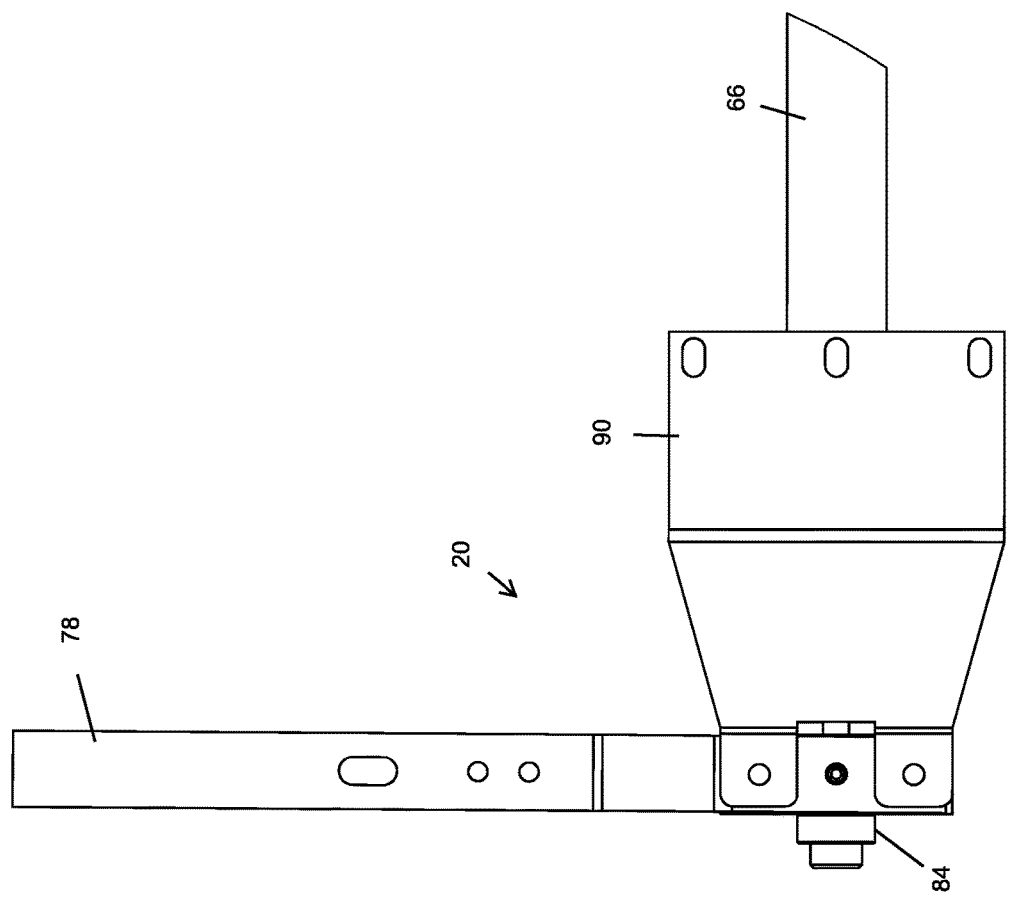
FIG. 15 is a close up elevation view of a top side of the clutch mechanism shown in FIG. 9, FIG. 10, FIG. 11, FIG. 12, FIG. 13 and FIG. 14.
Figure 16:
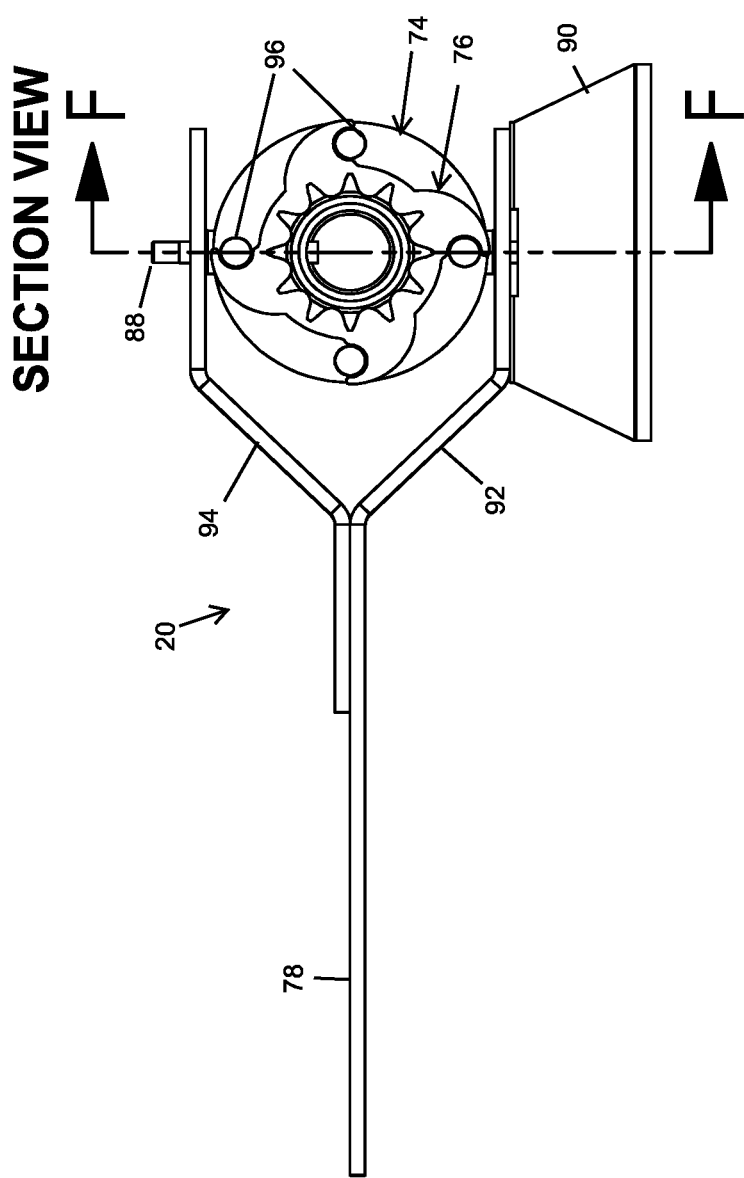
FIG. 16 is a close up elevation view of a side of the clutch mechanism shown in FIG. 9, FIG. 10, FIG. 11, FIG. 12, FIG. 13, FIG. 14 and FIG. 15 the view also showing a section line F/F which is shown in FIG. 17.
Figure 17:
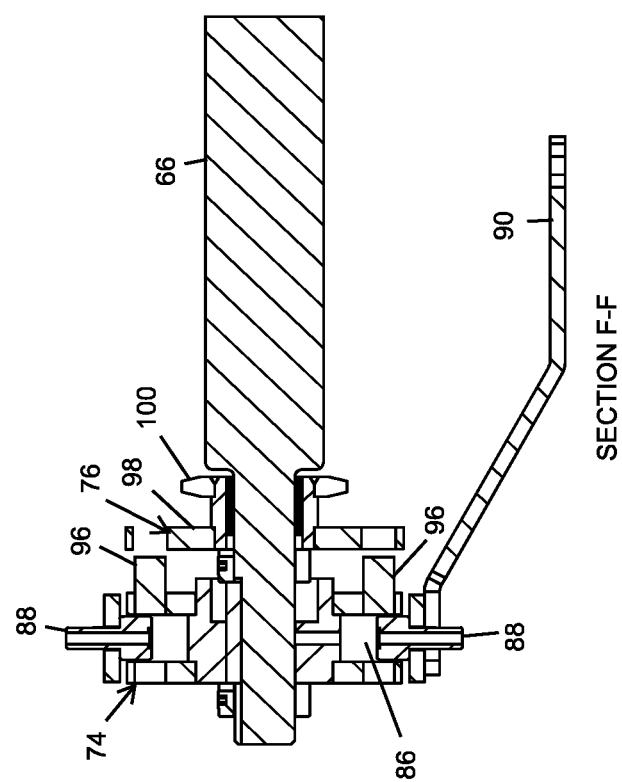
FIG. 17 is a close up side section elevation view of the clutch mechanism shown in FIG. 9, FIG. 10, FIG. 11, FIG. 12, FIG. 13, FIG. 14, FIG. 15 and FIG. 16, the view also showing a section along line F/F which is shown in FIG. 16, the section line extends vertically through the center of the axle and extends along the length of the axis of rotation of the axle.

In an alternative arrangement, with reference to FIG. 8A, the plenum 30 is divided into a heat section 34 and a cool section 36 by a divider 38. In one arrangement the fan system 32 is positioned at or in the divider 38 such that air is blown from the cool section 36 into the heat section 34.

That is, heat section 34 of plenum 30 is pressurized and receives heated air from fan system 32 that is blown outward through the perforated interior wall 24, through the grain within grain column 28, and out the perforated exterior wall 26. In contrast, cool section 36 is under vacuum and receives air that is sucked inward through the perforated exterior wall 26, through the grain within the grain column 28, and through the perforated interior wall 24 into the cool section 36 of plenum 30. In this arrangement, the heat section 34 tends to be the upper portion of the grain dryer 12 whereas the cool section 36 tends to be the lower portion of the grain dryer 12. The addition of a cool section 36 provides the benefit of sucking air into the plenum 30 through heated grain in the grain column 28. This provides the benefit of heating or preheating the air by pulling it through the heated grain in the grain column 28. This is also known as preserving this heat or recycling this heat or conservation of energy. This conservation of energy provides energy savings as the air is heated somewhat as it is pulled into the plenum 30. Then, this pre-heated air is heated further through the burner of the fan system 32. But, due to the pre-heating of the air, the fan system 32 does not have to raise the temperature of this air as far as it otherwise would without the pre-heating thereby providing energy savings. These energy savings can be substantial.

This energy conservation provided by a divided plenum 39 also provides the benefit of cooling the grain in the grain column 28 before it is discharged from the dryer. Cooling the grain before it is discharged provides many benefits. Cooling the grain before it is discharged is gentler on the grain as opposed to discharging hot grain. Cooling the grain before it is discharged allows for more-precise control of the drying operation. Cooling the grain before it is discharged makes the grain more durable and stable and requires less precautionary measures when storing the grain after drying it. As such, cooling the grain before discharging it provides many advantages.

While sucking air into the plenum 30 through heated grain in grain column 28 has its benefits, sucking air into the plenum 30 has substantial drawbacks. Namely, when air is sucked into the cool section 36 of plenum 30 fines within the grain column 28 are sucked into the plenum 30. These fines tend to accumulate within the limited space of the cool section 36 of the plenum 30 of grain dryer 12. The accumulation of fines within the cool section 36 of the grain dryer 12 requires periodic cleaning. If the accumulation of fines within the cool section 36 is not periodically cleaned, the accumulation of fines can lead to reduced dryer performance and can also be a fire hazard. However, existing grain dryers 12 make it difficult to clean the plenum 30 of grain dryer 12 as the discharge system 16 and the metering system 18 are connected together and operate simultaneously by operation of a single motor 14.

Another substantial drawback to a grain dryer 12 that has a heat section 34 and a cool section 36 is that sophisticated, complicated and sensitive components of the grain dryer 12 are placed within the plenum 30. Namely, the fan system 32 (and its related burner/heater) is positioned at the intersection of the heat section 34 and the cool section 36. This placement exposes the fan system 32 to the fines pulled into the cool section 36. This placement causes these components to be exposed to the harsh and dirty conditions within the plenum 30. This placement within the plenum 30 and their exposure to the harsh conditions within the plenum 30 can require increased maintenance which requires access to the plenum 30.

In one arrangement, as is shown in FIG. 8 and FIG. 8A, a cleanout door 39 is positioned in the lower end of the plenum 30. Clean out door 39 allows for sealing of the lower end of the plenum 30 when clean out door 39 is in place. Clean out door 39 allows for cleaning of plenum 30 and the removal of fines when clean out door 39 is removed. When clean out door 39 is removed, fines accumulated within the plenum 30 are allowed to drop into the discharge system 16 below the plenum 30.

Metering System:

Metering system 18 is formed of any suitable size, shape and design and is configured to meter grain out of the grain column 28 at adjustable desired rates. In the arrangement shown, as one example, metering system 18 is positioned at, adjacent or near the lower end of grain column 28. That is, in the arrangement shown, metering system 18 is positioned at, adjacent or near the lower end 40 of interior wall 24 and the lower end 42 of exterior wall 26 and is configured to meter grain out of grain column 28. The grain metered out of grain column 28 falls by the force of gravity into the discharge system 16.

Figure 4:
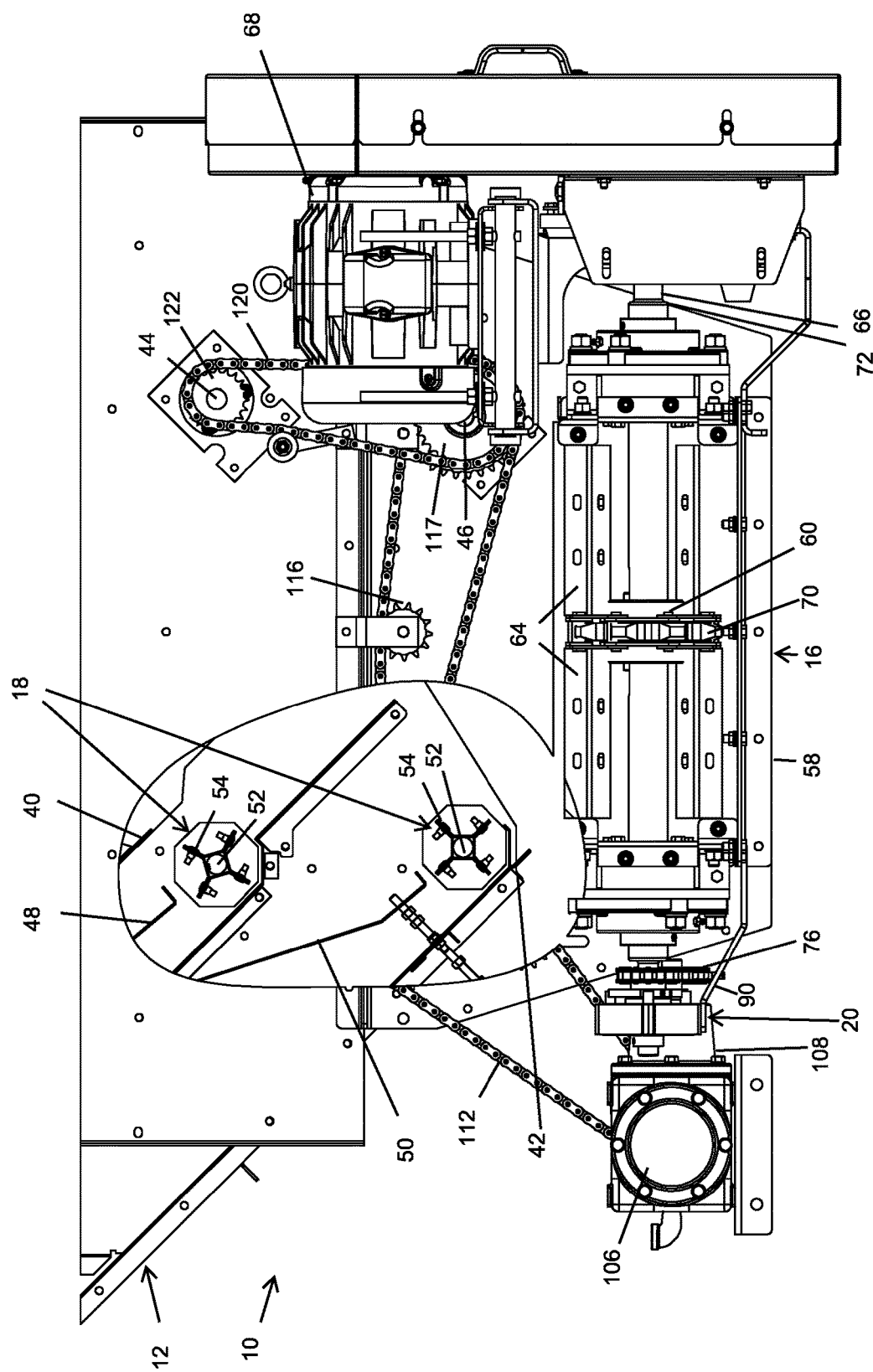
FIG. 4 is an elevation view similar to FIG. 2 and FIG. 3, with the removal of additional parts to show the upper metering roll and the lower metering roll within the grain dryer; the view showing the upper metering roll and lower metering roll having an axle and a plurality of flights therein that are configured to dispense grain from the grain column.
Figure 5:
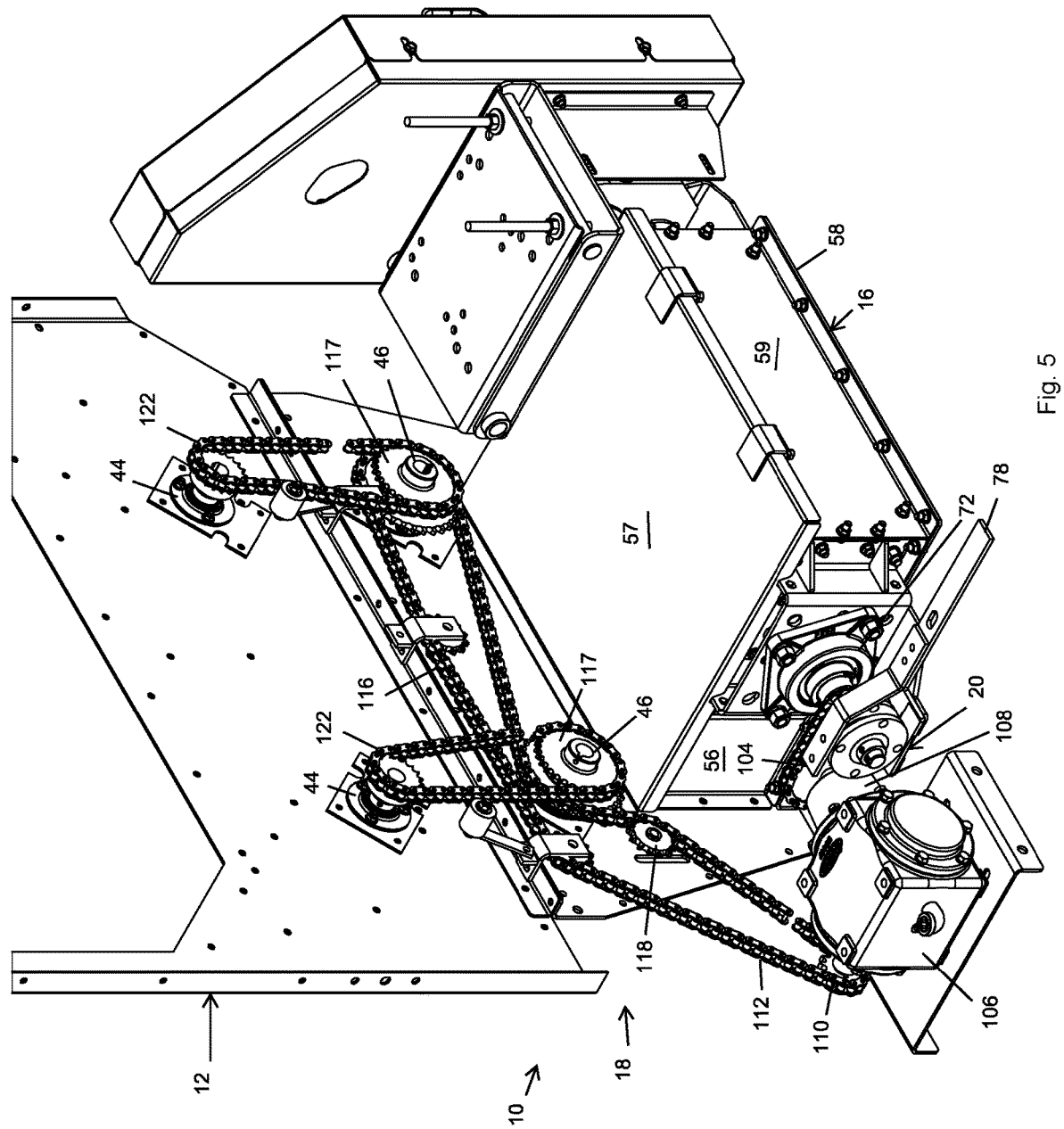
FIG. 5 is a perspective view of an end of a grain dryer; the view showing a discharge system connected to the bottom end of the grain dryer; the view showing an axle extending through the discharge system and a clutch mechanism connected to an end of the axle; the view showing a gearbox connected to the clutch mechanism and a plurality of metering rolls connected to the gearbox by a series of chains and sprockets.
Figure 6:
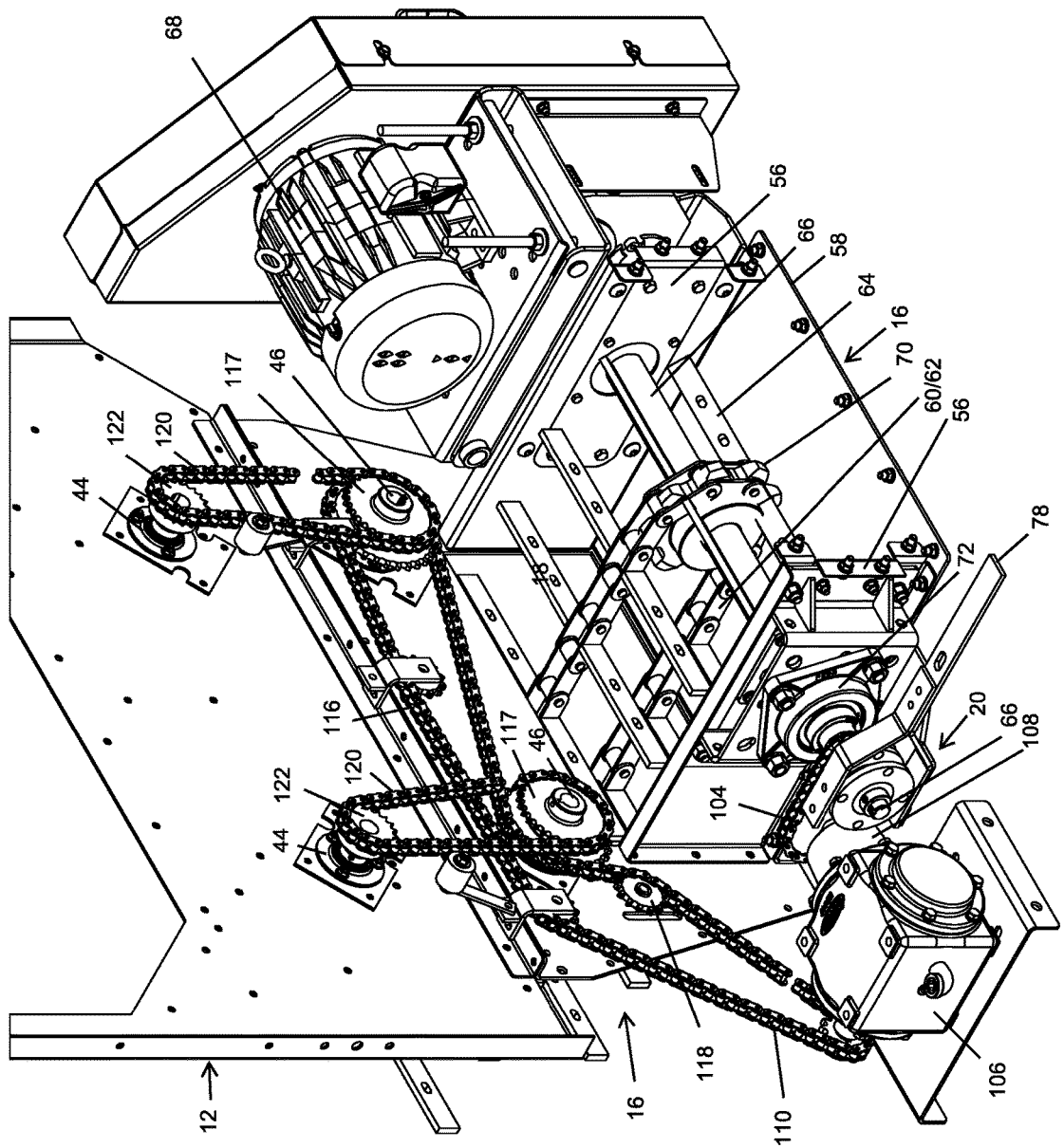
FIG. 6 is a perspective view similar to FIG. 5, with the addition of a motor that is connected to one end of the axle opposite the clutch mechanism and with the removal of the end wall and upper wall of the discharge system; the view showing the drag chain positioned within the discharge system with flights connected to the drag chain that are configured to move the grain; the view also showing a sprocket connected to the axle and the teeth of the sprocket intermeshed with the links of the drag chain.
Figure 7:
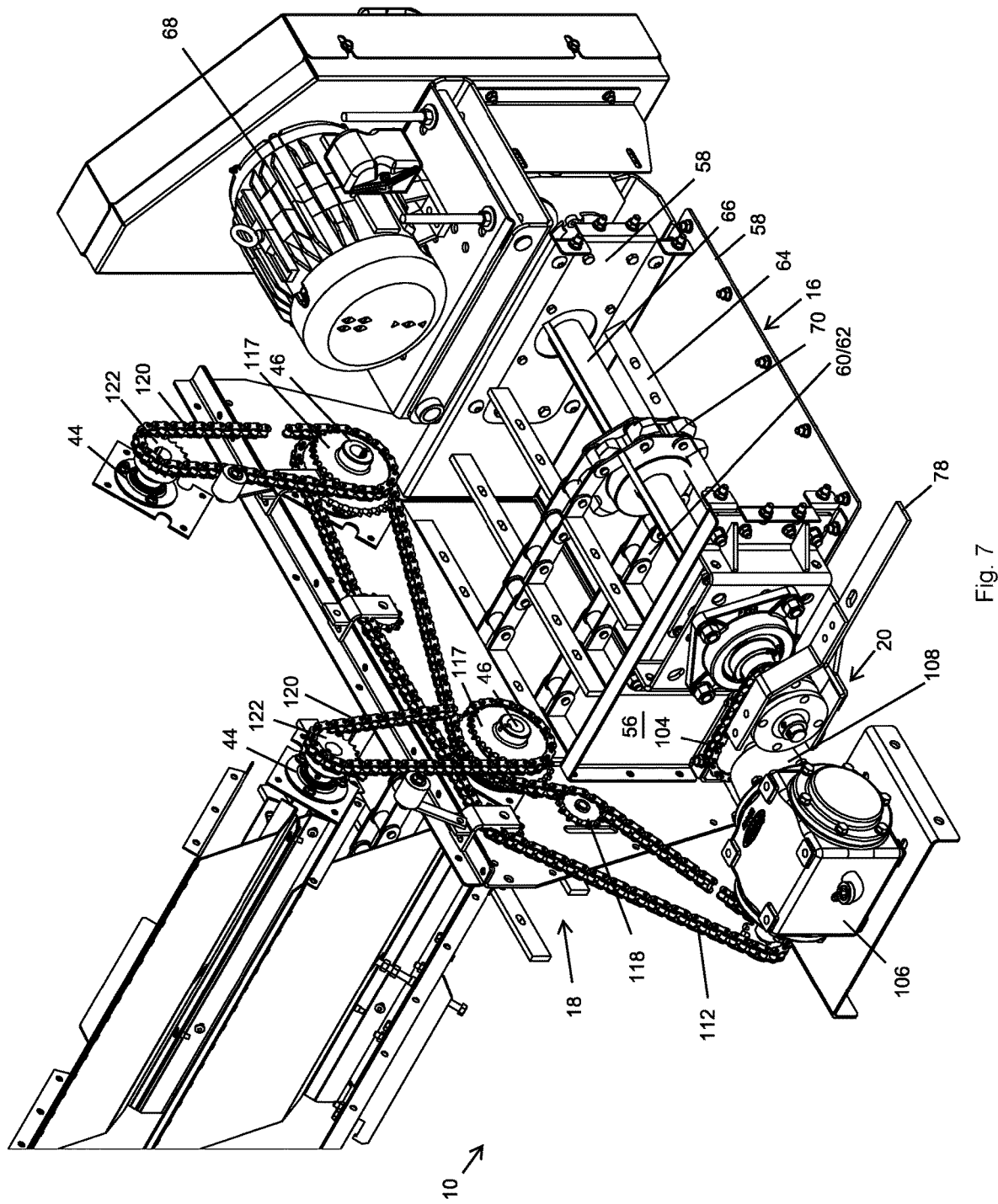
FIG. 7 is a perspective view similar to FIG. 5 and FIG. 6, with the removal of additional parts to show the upper metering roll and the lower metering roll within the grain dryer; the view showing the upper metering roll and lower metering roll having an axle and a plurality of flights therein that are configured to dispense grain from the grain column which then falls down into the discharge system.

In the arrangement shown in FIG. 4, as one example, metering system 18 is formed of an upper metering roll 44 positioned at the upper side of grain column 28 at, adjacent or near the lower end 40 of interior wall 24 and a lower metering roll 46 positioned at the lower side of grain column 28 at, adjacent or near the lower end 42 of exterior wall 26. However, any number of metering rolls are hereby contemplated for use, such as one, two, three, four, five or more.

In the arrangement shown, as one example, with an upper metering roll 44 positioned adjacent the interior wall 24 and a lower metering roll 46 positioned adjacent the exterior wall 26 this provides the benefit of metering out different portions of the grain column 28 at different rates or speeds or amounts. That is, due to heated air being blown outward from plenum 30, the grain within grain column 28 adjacent interior wall 24 tends to heat faster, and dry quicker, as it is closer to the heat source. In contrast, the grain within grain column 28 adjacent exterior wall 26 tends to heat slower, and take longer to dry, as it is further from the heat source.

By having an upper metering roll 44 and a lower metering roll 46 this allows for grain within different portions of the grain column 28 to be metered at different rates as well as being discharged at different positions. That is, the upper metering roll 44 may be operated to dispense the grain that is heated the fastest at a higher metering rate so as to not over-dry the grain in the interior portion of the grain column. In contrast, the lower metering roll 46 may be operated to dispense the grain that is heated slower at a lower metering rate so as to allow this grain adequate time within the grain column 28 to sufficiently dry. In addition by placing the upper metering roll 44 above the lower metering roll 46 this allows for grain adjacent the interior wall 24 to be discharged sooner than grain adjacent the exterior wall 26. As such, providing an upper metering roll 44 and a lower metering roll 46 in the grain column 28 allows for more precise control of the grain drying process and provides more even drying results.

To properly guide grain toward the upper metering roll 44 and the lower metering roll 46, an upper guide 48 and a lower guide 50 are positioned within grain column 28. Upper guide 48 and lower guide 50 are formed of any suitable size, shape and design. In the arrangement shown, as one example, upper guide 48 angles from the interior wall 24 to upper metering roll 44 and lower guide 50 angles from a mid-region of grain column 28 to lower metering roll 46. In this way, upper guide 48 and lower guide 50 separate grain column 28 into two streams of grain, an interior stream and an exterior stream. These independent interior stream and exterior stream of grain are independently metered by upper metering roll 44 and lower metering roll 46.

In an alternative arrangement, with reference to FIG. 8, as another example, metering system 18 includes only a lower metering roll 46 which is positioned adjacent the lower end 40 of exterior wall 28. This arrangement includes only a single upper guide 48 angles from the interior wall 24 to lower metering roll 46.

Upper metering roll 44 and lower metering roll 46 are formed of any suitable size, shape and design and serve to meter grain out of grain column 28. In the arrangement shown, upper metering roll 44 and lower metering roll 46 are formed of approximately the same size, shape and design and include an elongated axle 52 with a plurality of flights 54 that are connected to axle 52 that extend along all or a portion of the length of axle 52. In the arrangement shown, as one example, four flights 54 are connected to axle 52 and extend outward from axle 52. However any number of flights 54 is hereby contemplated for use. Axle 52 serves as the axis of rotation of upper metering roll 44 and lower metering roll 46 and as the axle 52 rotates each flight 54 dispenses an amount of grain from the grain column 28 that falls by the force of gravity into the discharge system 16.

Discharge System:

Discharge system 16 is formed of any suitable size, shape and design and is configured to discharge grain metered out of grain column 28 by metering system 18 out of the grain dryer 12. In the arrangement shown, as one example, discharge system 16 is what is known as a drag unload or a drag chain. However any other form of an unload system is hereby contemplated for use such as a belt, an auger, or the like.

In the arrangement shown, as one example, discharge system 16 includes a pair of sidewalls 56 that connect at their upper end to the lower end 42 of opposing exterior walls 26 in approximate parallel spaced relation to one another. The lower end of sidewalls 56 connect to the outward edges of a bottom wall 58. Sidewalls 56 and bottom wall 58 form planes that extend in approximate perpendicular alignment to one another and thereby form a generally square or rectangular space at the lower end of grain dryer 12. The upper side of the discharge system 16 that protrudes past the end of grain column 28 is enclosed by an upper wall 57 and the end of discharge system 16 is enclosed by an end wall 59. End wall 59 extends between opposing sidewalls 56 and bottom wall 58 and upper wall 57. Upper wall 57 extends between opposing sidewalls 56 and end wall 59. Grain metered out of grain column 28 by metering system 18 falls into the hollow interior formed by sidewalls 56, bottom wall 58, upper wall 57 and end wall 59.

A drag chain 60 is positioned within the hollow interior of discharge system 16 formed by sidewalls 56 and bottom wall 58. Drag chain 60 is formed of any suitable size, shape and design and is configured to engage grain that falls into discharge system 16 and move the grain out of discharge system 16. In the arrangement shown, as one example, drag chain 60 is formed of a plurality of links 62 that are connected to one another in pivoting fashion and includes a plurality of flights 64 that are positioned at spaced intervals along links 62 and extend outwardly therefrom. In the arrangement shown, as one example, links 62 are approximately centrally positioned between opposing sidewalls 56 and flights 64 extend laterally outward on either side of links 62 and terminate just prior to the inward surfaces of opposing sidewalls 56. In one arrangement, extended paddles made of a plastic or composite material, such as an ultrahigh molecular weight plastic or composite, are connected to flights 64 and serve to extend the surface of area of flights 64. These plastic or composite paddles not only increase the amount of grain moved by the drag chain 60, they are also highly durable, are gentle on grain (as opposed to metal paddles) and are self-lubricating, among other advantages.

An axle 66 extends through opposing sidewalls 56 of discharge system 16 adjacent an end of discharge system 16. Axle 66 also extends through one end of drag chain 60 and facilitates rotation of drag chain 60. In the arrangement shown, axle 66 operatively connects on one end to motor 68 that facilitates rotation of axle 66. That is, when motor 68 rotates so rotates axle 66. Motor 68 connects to axle 66 by any manner, means or method such as through intermeshing gears, through the use of chains or belts, through a transmission, or by any other manner or method.

Axle 66 includes a sprocket 70 thereon that engages the links 62 and facilitates rotation of drag chain 60. More specifically, in the arrangement shown, sprocket 70 is positioned along the length of axle 66 and is aligned with links 62. Sprocket 70 includes a plurality of teeth that engage openings in links 62 thereby imparting rotation upon drag chain 60 in meshing fashion as axle 66 is rotated by motor 68.

Bearing members 72 are connected to axle 66 adjacent to where axle 66 extends through sidewalls 56. Bearing members 72 connect axle to sidewalls 56 in a rigid and stable manner and also facilitating rotation of axle 66.

Clutch Mechanism:

In the arrangement shown, as one example, clutch mechanism 20 is connected to an end of axle 66 opposite the end connected to motor 68. Clutch mechanism 20 is formed of any suitable size, shape and design and is configured to move between an engaged position and a disengaged position. In the arrangement shown, as one example, clutch mechanism includes a drive member 74, a driven member 76 and a control arm 78.

Drive member 74 is formed of any suitable size, shape and design and is configured to mount on the outward end of axle 66 and is configured to rotate as axle 66 rotates. In the arrangement shown, as one example, drive member 74 is generally circular in shape when viewed from an end of axle 66 and includes an opening 80 at its center that is sized and shaped to receive the outward end of axle 66 as well as a key feature 82 that facilitates rotation of drive member 74 as axle 66 rotates. While drive member 74 rotates with axle 66, drive member 74 is able to slide a distance along the length of axle 66. A collar 84 is positioned on axle 66 on the inward and outward sides of drive member 74. Collars 84 connect to axle 66 and define the inward most position and outward most positions that drive member 74 can slide along axle 66.

When viewed from the side, drive member 74 includes a slot 86 between an inward side and outward side of the drive member 74. This slot 86 is sized and shaped to receive cam followers 88 that are connected to control arm 78.

Control arm 78 is formed of any suitable size, shape and design and is configured to move clutch mechanism 20 between an engaged position and a disengaged position. In the arrangement shown, as one example, control arm 78 is pivotally connected to a bracket 90 that connects to discharge system 16. Control arm 78 connects at its inward end to bracket 90 and extends outwardly therefrom a distance so as to provide a user with leverage over the operation of clutch mechanism 20. In the arrangement shown, as one example, control arm 90 has a lower arm 92 that extends below the lower side of drive member 74 and includes a cam follower 88 that is received within slot 86 adjacent the lower end of drive member 74, and an upper arm 94 that extends above the upper side of drive member 74 and includes a cam follower 88 that is received within slot 86 adjacent the upper end of drive member 74.

Control arm 78 pivots upon bracket 90 as control arm 78 moves between an engage position and a disengage position. As control arm 78 pivots, the engagement between the upper and lower positioned cam followers 88 within slot 86 laterally moves drive member 74 along the length of axle 66.

The inward side of drive member 74 includes one or more drive pins 96 that extend outward from the inward side of drive member 74 a distance. In the arrangement shown, four drive pins 96 are shown in use, however any number of drive pins 96 are hereby contemplated for use such as one, two, three, four, five, six, seven, eight, nine, ten or more. In the arrangement shown, as one example, drive pins 96 are generally cylindrically shaped members that extend perpendicularly out of drive member 74 and terminate in a flat end. When clutch mechanism 20 is in an engaged position drive pins 96 are engaged with driven member 76 and thereby facilitate rotation of driven member 76.

Clutch mechanism 20 includes a driven member 76. Driven member 76 is formed of any suitable size, shape and design and is configured to mount on the outward end of axle 66 just inward of drive member 74 and the inward positioned collar 84. Driven member 76 is configured to rotate as axle 66 rotates when driven member 76 is engaged with drive member 74, and driven member 76 is configured to remain idle, and not rotate, as axle 66 rotates when driven member 76 is disengaged with drive member 74.

In the arrangement shown, as one example, driven member 76 includes an outward section 98 and an inward section 100. In the arrangement shown, as one example, outward section 98 and inward section 100 of driven member 76 are formed of a single, solid and monolithic member that is formed by machining, molding, casting or the like. In the arrangement shown, as one example, outward section 98 includes a plurality of recesses 102 that are configured to receive and hold drive pins 96 therein when clutch mechanism 20 is in an engaged position. In this way, the engagement of drive pins 96 within recesses 102 facilitate rotation of driven member 76. In contrast, when clutch mechanism 20 is in a disengaged position, recesses 102 are clear of drive pins 96. In this way, the disengagement of drive pins 96 from recesses 102 facilitates rotation of drive member 74 as driven member 76 remains stationary. In one arrangement, to facilitate rotation of axle 66 within driven member 76 when clutch mechanism 20 is in a disengaged position a bearing member is positioned at the interface between driven member 76 and axle 66.

The inward section 100 of driven member 76 includes sprocket teeth that are configured to engage a first chain 104. When clutch mechanism 20 is in an engaged position, the rotation of axle 66 rotates drive member 74 which rotates driven member 76 by the engagement of drive pins 96 with recesses 102 and the intermeshing engagement of the sprocket teeth of the inward section 100 of driven member 76 drives first chain 104.

One benefit of the clutch mechanism 20 described herein is that the clutch mechanism 20 fits entirely upon the end of axle 66. In this way, clutch mechanism 20 is compact, out of the way and requires minimum space. In addition, operation of the clutch mechanism 20 is simple, robust, easy and convenient simply by moving control arm 78. With that said, any other form of a clutch member or clutch mechanism that selectively engages and selectively disengages two components (e.g. drive member 74 and driven member 76) is hereby contemplated for use.

Chain System and Gearbox:

In the arrangement shown, as one example, clutch mechanism 20 connects to gearbox 106 by first chain 104. More specifically, first chain 104 extends between inward section 100 of driven member 76 of clutch mechanism 20 and input 108 of gearbox 106.

Gearbox 106 is any device that receives rotation from axle 66 and clutch mechanism 20 at an input 108 at a first rotational speed and outputs rotation at a second rotational speed at an output 110. In one arrangement, gearbox 106 is configured to reduce the rotational speed of axle 66 such that the input 108 of gearbox 106 rotates faster than output 110 of gearbox 106. In an alternative arrangement, gearbox 106 is configured to increase the rotational speed of axle 66 such that the output 110 of gearbox 106 rotates faster than the input 108 of gearbox 106. The use of any gear ratio for gearbox 106 is hereby contemplated for use.

A second chain 112 connects the output 110 of gearbox 106 to lower metering rolls 46. In the arrangement shown, as one example, output 110 of gearbox 106 includes sprocket teeth that are configured to engage second chain 112. When clutch mechanism 20 is in an engaged position, the rotation of axle 66 rotates drive member 74 which rotates driven member 76 by the engagement of drive pins 96 with recesses 102 and the intermeshing engagement of the sprocket teeth of the inward section 100 of driven member 76 drives first chain 104. First chain 104 drives the input 108 of gearbox 106 at a first rotational speed which drives the output 110 at a second rotational speed. The intermeshing sprocket teeth of output 110 drives second chain 112 which intermeshes with sprocket teeth on the outward end of lower metering rolls 46.

More specifically, in the arrangement shown, as one example, second chain 112 extends from output 110 of gearbox 106 upward and over the top side a first idler sprocket 114 and a second idler socket 116. Second chain 112 extends from the second idler sprocket 116 around an inner portion of sprocket 117 connected to the first of the lower metering rolls 46 on one side of the discharge system 16. Second chain 112 extends from the first of the lower metering roll 46 to wrap over and around an inner portion of sprocket 117 connected to the second of the lower metering rolls 46. After passing over the second of the lower metering rolls 46, second chain 112 passes under a third idler sprocket 118 before returning to output 110 of gearbox 106, at which point the process repeats itself.

In this way, rotation of output 110 of gearbox 106 causes rotation of first idler sprocket 114, second idler sprocket 116, the first of the lower metering rolls 46 and the second of the lower metering rolls 46 and the third sprocket 118. In addition, rotation of the lower metering rolls 46 causes rotation of the upper metering rolls 44 through connection of the upper metering rolls 44 to lower metering rolls 46 by secondary chains 120.

More specifically, secondary chains 120 wrap around an outer portion of sprockets 117 of lower metering rolls 46 at their lower end. Secondary chains 120 wrap around sprockets 122 of upper metering rolls 44 at their upper end. In this way, rotation of lower metering rolls 46 by second chain 112 causes rotation of upper metering rolls 44 by secondary chains 120.

Upper metering rolls 44 and lower metering rolls 46 may rotate at the same speed or a different speed. The relative speed of rotation of the lower metering rolls 46 and upper metering rolls 44 may be adjusted by adjusting the size of sprocket 117 and sprocket 122. In one arrangement, to facilitate quicker removal of grain adjacent the interior wall 24, upper metering rolls 44 rotate faster than lower metering rolls 46.

In Operation:

During normal operation of grain dryer 12, clutch mechanism 20 is in an engaged position where drive pins 96 of drive member 74 are engaged with the recesses 102 of driven member 76. In this engaged position, the operation of motor 68 causes rotation of axle 66. The rotation of axle 66 causes rotation of sprocket 70, which is mounted on axle 66, which meshes with the links 62 of drag chain 60. As such, the rotation of axle 66 causes rotation of drag chain 60 of discharge system 16.

As grain is metered out of grain dryer 12, this grain falls through the drag chain 60 and lands on the upper surface of bottom wall 58 of discharge system 16 between opposing sidewalls 56. As the drag chain 60 is moved along the upper surface of bottom wall 58, the flights 64 of drag chain 60 engage the grain and push it toward an end of the discharge system 16 thereby discharging it out of the discharge system 16.

Simultaneously, as axle 66 rotates, this causes the drive member 74 of clutch mechanism 20 to rotate. As the drive pins 96 of drive member 74 are engaged with the recesses 102 of the outward section 98 of driven member 76, rotation of the drive member 74 causes rotation of the driven member 76. The connection of first chain 104 around the sprocket gear teeth of the inward section 100 of driven member 76 causes rotation of the input 108 of gearbox 106.

Rotation of the input 108 of gearbox 106 causes rotation of the output 110 of gearbox 106. The meshing engagement of the sprocket teeth of the output 110 of gearbox 106 causes movement of second chain 112. Movement of second chain 112 causes rotation of first idler sprocket 114, second idler sprocket 116, the first of the lower metering rolls 46 and the second of the lower metering rolls 46 and the third sprocket 118, in unison. Rotation of the lower metering rolls 46 causes rotation of the upper metering rolls 44 through connection of the upper metering rolls 44 to lower metering rolls 46 by secondary chains 120.

As the upper metering rolls 44 and lower metering rolls 46 rotate, grain that fills the flights 54 of upper metering rolls 44 and lower metering rolls 46 is removed from the grain column 28 and dumped into the discharge system 16. The upper metering rolls 44 and lower metering rolls 46 may rotate at the same speed or at different speeds, and therefore may discharge grain at the same or at different rates.

When the grain falls into the discharge system 16, the drag chain 60 discharges the grain out of the discharge system 16 in the manner described herein.

While this manner of operation is desirable during normal operation, when fines need to be cleaned out of the plenum 30, it is desirable to operate the discharge system 16 while the metering system 18 does not operate. To accomplish this task, the user turns off the motor 68 which stops operation of both the metering system 18 and the discharge system 16.

The user then moves the control arm 78 from an engaged position to a disengaged position. In doing so, the control arm 78 pivots upon bracket 90. As control arm 78 pivots, this causes cam followers 88 that are held within slot 86 of drive member 74 to slide drive member 74 along the length of axle 66. This lateral movement of drive member 74 causes drive pins 96 to pull out of and clear recesses 102 in the outward section 98 of driven member 76.

Once drive pins 96 are clear of recesses 102 in the outward section 98 of driven member 76, when motor 68 is operated this causes axle 66 to rotate which rotates drag chain 60 of discharge system 16. Axle 66 also rotates drive member 74 of clutch mechanism 20. However, due to the disengaged state of clutch mechanism 20 driven member 76 remains stationary as axle 66 rotates.

This arrangement facilitates the operation of the discharge system 16 while the metering system 18 does not operate. This allows a user to again operate the motor 68 and discharge the grain within the discharge system 16 without the grain constantly refilling the discharge system 16. This allows the user to empty grain from the discharge system while the grain column 28 of grain dryer 12 remains full of grain. This eliminates the need to fully empty the grain dryer 12 to perform periodic maintenance and cleaning of the plenum 30 of grain dryer 12.

Once all of the grain is removed from the discharge system 16 this allows a user to clean out the plenum 30, discharge system 16 and other portions of the grain dryer 12 without introducing the fines or other contaminants into the grain flow and/or into the grain storage system connected to the grain dryer 12, such as a grain bin.

In one arrangement, when cleaning the plenum 30 the user removes all or a portion of the bottom wall 58 of the discharge system 16, or cleanout doors in the bottom wall 58 of the discharge system 16 are removed. When the user removes the cleanout door 39 of the plenum 30 the fines and other debris simply fall through the drag chain 60 and out the bottom end of the discharge system thereby clearing the fines from the system 10. This prevents the fines from contaminating the grain.

When cleaning has been completed, the user simply moves the control arm 78 back to the engaged position and the drive member 74 and driven member 76 reconnect with one another and normal operation of the grain dryer 12 resumes with the simultaneous operation of the discharge system 16 and the metering system 18 with a single motor 68. In this way, the user was able to clean the plenum 30, discharge system 16 and other portions of the grain dryer 12 without having to fully empty the grain dryer 12 (meaning that grain filled the grain column 28 during the cleaning process) and without having to introduce the fines cleaned out of the grain dryer 12 into the grain.

From the above discussion it will be appreciated that the grain dryer unload system presented herein improves upon the state of the art and that some, if not all, of the objectives have been met.

Specifically, the grain dryer unload system presented herein: facilitates easier clean out of the grain dryer; facilitates independent operation of a discharge system from the metering system; allows fines cleaned out of the grain dyer to be dumped out of the grain dryer and not into the connected grain storage components; reduces fire hazards by facilitating easier cleaning of the grain dryer; provides new functionality for grain dryers; improves the safety of using grain dryers; is easy to use; has a robust design; works effectively; saves time; is efficient to use; has a long useful life; does not negatively affect the grain dryer's ability dry grain; allows a single motor to be used to operate the discharge system and the metering system while also allowing for effective cleaning of the grain dryer; is durable; is relatively inexpensive; is high quality; can be used with practically any grain dryer; and makes it easier to handle and dry large amounts of grain, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A grain dryer system, comprising:
a grain dryer;
the grain dryer configured to dry grain;
an unload system;
the unload system operatively connected to the grain dryer;
the unload system configured to unload grain from the grain dryer;
the unload system having a metering system and a discharge system;
a motor operatively connected to the metering system and the discharge system;
a clutch operatively connected between the metering system and the discharge system;
the clutch configured to move between an engaged position and a disengaged position;
wherein when the clutch is in the engaged position, the motor operates the metering system and the discharge system;
wherein when the clutch is in the disengaged position, the motor operates the discharge system while the metering system does not operate; and
a gearbox operably connected to the clutch between the motor and the metering system;
wherein the gearbox is positioned between the clutch and the metering system.

2. The system of claim 1 wherein the discharge system is a drag chain system.

3. The system of claim 1 wherein the discharge system is an auger system.

4. The system of claim 1 wherein the discharge system is a belt system.

5. The system of claim 1 wherein the metering system meters grain out of the grain dryer and into the discharge system.

6. The system of claim 1 wherein the metering system includes a plurality of metering rolls.

7. The system of claim 1 wherein the motor operatively connects to an axle which operatively connects to the discharge system.

8. The system of claim 1 wherein the motor operatively connects to an axle and the clutch is connected to an end of the axle.

9. The system of claim 1, wherein the gearbox has an input operably connected to the clutch and an output operably connected to the metering system; and
wherein the gearbox is configured to rotate the output at a faster rate than then input is rotated.

10. The system of claim 1, wherein the gearbox has an input operably connected to the clutch and an output operably connected to the metering system; and
wherein the gearbox is configured to rotate the output at a slower rate than then input is rotated.

11. The system of claim 1, wherein the gearbox has an input operably connected to the clutch and an output operably connected to the metering system;
wherein the input is configured to rotate about a first axis;
wherein the output is configured to rotate about a second axis that is different from the first axis.

12. The system of claim 1, wherein the gearbox has an input operably connected to the clutch and an output operably connected to the metering system;
wherein the input is configured to rotate about a first axis;
wherein the output is configured to rotate about a second axis that is perpendicular to the first axis.

13. A grain dryer unload system, comprising:
a grain dryer;
the grain dryer having a metering system;
the grain dryer having a discharge system;
a motor;
the motor operatively connected to the metering system;
the motor operatively connected to the discharge system;
a clutch operatively connected to the metering system and the discharge system;
the clutch configured to move between an engaged position and a disengaged position;
wherein when the clutch is in the engaged position, the motor operates the metering system and the discharge system;
wherein when the clutch is in the disengaged position, the motor operates the discharge system while the metering system does not operate; and
a gearbox operably connected to the clutch between the motor and the metering system;
wherein the gearbox is positioned between the clutch and the metering system.

14. The system of claim 13 wherein the discharge system is a drag chain system.

15. The system of claim 13 wherein the discharge system is an auger system.

16. The system of claim 13 wherein the discharge system is a belt system.

17. The system of claim 13 wherein the metering system meters grain out of the grain dryer and into the discharge system.

18. The system of claim 13 wherein the metering system includes a plurality of metering rolls.

19. The system of claim 13 wherein the motor operatively connects to an axle which operatively connects to the discharge system.

20. The system of claim 13 wherein the motor operatively connects to an axle and the clutch is connected to an end of the axle.

21. A grain dryer unload system, comprising:
a motor;
the motor operatively connected to a shaft such that operation of the motor rotates the shaft;
the shaft operatively connected to a discharge system;
the shaft operatively connected to a clutch;
the shaft operatively connected to a metering system;
wherein when the clutch is in an engaged position, the motor operates the metering system and the discharge system;
wherein when the clutch is in a disengaged position, the motor operates the discharge system while the metering system does not operate;
wherein the clutch includes a drive member operably connected to the motor and a driven member operatively connected to the metering system;
wherein when the clutch is in the engaged position, the driven member is rotated as the drive member is rotated; and wherein the drive member and the driven member are configured to rotate about the same axis.

22. The system of claim 21 wherein the discharge system is selected from a group consisting of: a drag chain system, an auger system and a belt system.

23. The system of claim 21 wherein the metering system includes a plurality of metering rolls.

24. A grain dryer unload system, comprising:

a motor;

the motor operatively connected to a shaft such that operation of the motor rotates the shaft;

the shaft operatively connected to a discharge system such that rotation of the shaft operates the discharge system;

the shaft operatively connected to a clutch;

the clutch operatively connected to a metering system;

wherein when the clutch is in an engaged position, the motor operates the metering system and the discharge system;

wherein when the clutch is in a disengaged position, the motor operates the discharge system while the metering system does not operate;

wherein the clutch includes a drive member operably connected to the motor and a driven member operatively connected to the metering system;

wherein when the clutch is in the engaged position, the driven member is rotated continuously as the drive member is rotated; and wherein when the clutch is in the disengaged position, the driven member is not rotated when the drive member is rotated.

25. The system of claim 24 wherein the discharge system is selected from a group consisting of: a drag chain system, an auger system and a belt system.

* * * * *

UNITED STATES PATENT AND TRADEMARK OFFICE
CERTIFICATE OF CORRECTION

PATENT NO. : 11,067,337 B2
APPLICATION NO. : 16/186643
DATED : July 20, 2021
INVENTOR(S) : Casey Scott Heilskov et al.

Page 1 of 1

It is certified that error appears in the above-identified patent and that said Letters Patent is hereby corrected as shown below:

In the Claims

Column 15 Lines 55-59, should read:
9. The system of claim 1, wherein the gearbox has an input operably connected to the clutch and an output operably connected to the metering system; and
wherein the gearbox is configured to rotate the output at a faster rate than the input is rotated.

Column 15 Lines 60-64, should read:
10. The system of claim 1, wherein the gearbox has an input operably connected to the clutch and an output operably connected to the metering system; and
wherein the gearbox is configured to rotate the output at a slower rate than the input is rotated.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*